(12) United States Patent
Katsuda et al.

(10) Patent No.: US 6,793,244 B1
(45) Date of Patent: Sep. 21, 2004

(54) MULTI-STAGE EXPANSION TIRE HYBRID INFLATOR

(75) Inventors: Nobuyuki Katsuda, Hyogo (JP); Yoshihiro Nakashima, Hyogo (JP); Masayuki Yamazaki, Hoygo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 7 days.

(21) Appl. No.: 09/959,766

(22) PCT Filed: Jun. 16, 2000

(86) PCT No.: PCT/JP00/03960

§ 371 (c)(1), (2), (4) Date: Nov. 7, 2001

(87) PCT Pub. No.: WO00/78580

PCT Pub. Date: Dec. 28, 2000

(30) Foreign Application Priority Data

| Jun. 18, 1999 | (JP) | ............................................ | 11/172144 |
| Oct. 28, 1999 | (JP) | ............................................ | 11/306592 |
| Oct. 28, 1999 | (JP) | ............................................ | 11/306598 |
| Oct. 28, 1999 | (JP) | ............................................ | 11-306601 |
| Apr. 28, 2000 | (JP) | ............................................ | 2000/129688 |

(51) Int. Cl.[7] .................................................. B62K 1/00
(52) U.S. Cl. ....................................... 280/741; 280/737
(58) Field of Search ................................ 280/737, 741, 280/742, 736; 102/530, 531

(56) References Cited

U.S. PATENT DOCUMENTS

| 3,758,131 A | | 9/1973 | Stephenson et al. | |
| 3,773,353 A | | 11/1973 | Trowbridge et al. | |
| 3,868,124 A | | 2/1975 | Johnson | |
| 3,905,515 A | * | 9/1975 | Allemann | ........................ 222/3 |
| 3,972,545 A | * | 8/1976 | Kirchoff et al. | ............ 280/735 |
| 5,351,988 A | | 10/1994 | Bishop et al. | |
| 5,564,743 A | * | 10/1996 | Marchant | ..................... 280/741 |
| 5,602,361 A | | 2/1997 | Hamilton et al. | |
| 5,685,558 A | * | 11/1997 | Cuevas | .................... 280/728.2 |
| 5,794,973 A | | 8/1998 | O'Loughlin et al. | |
| 5,813,694 A | * | 9/1998 | Jeong | ......................... 280/737 |
| 5,882,036 A | * | 3/1999 | Moore et al. | ............... 280/736 |
| 6,019,389 A | * | 2/2000 | Burgi et al. | ................ 280/736 |
| 6,068,291 A | | 5/2000 | Lebaudy et al. | |
| 6,068,292 A | * | 5/2000 | Renz | .......................... 280/737 |
| 6,089,598 A | | 7/2000 | Snyder et al. | |
| 6,168,200 B1 | * | 1/2001 | Greist, III et al. | .......... 280/736 |
| 6,206,414 B1 | * | 3/2001 | Cook et al. | ................ 280/734 |
| 6,231,075 B1 | | 5/2001 | Otsu | |

FOREIGN PATENT DOCUMENTS

| EP | 0 673 809 A1 | | 9/1995 |
| EP | 0 741 064 A2 | | 11/1996 |
| GB | 2 322 436 A | | 8/1998 |
| JP | 48-81234 | | 10/1973 |
| JP | 8-282427 A | | 10/1996 |
| JP | 9-76870 | | 3/1997 |
| JP | 3049047 | | 3/1998 |
| JP | 10-100851 | | 4/1998 |
| JP | 10-230814 | | 9/1998 |
| JP | 11-48905 | | 2/1999 |
| JP | 11-129858 | | 5/1999 |
| WO | WO 98/28168 A1 | * | 7/1998 |
| WO | WO 98/57828 A1 | * | 12/1998 |
| WO | WO 98/57829 A1 | * | 12/1998 |

* cited by examiner

Primary Examiner—Ruth Ilan
(74) Attorney, Agent, or Firm—Birch, Stewart, Kolasch & Birch, LLP

(57) ABSTRACT

A hybrid inflator having improved inflating performance of an air bag is provided. A gas generator provided in a housing 102, in which a pressurized medium is charged under a high pressure, includes a first gas generating chamber 120 and a second gas generating chamber 130. By allowing the two gas generating chambers to generate high-temperature combustion gas, respectively, the inflating speed and the like of the air bag are further improved.

31 Claims, 12 Drawing Sheets

MULTI-STAGE EXPANSION TIRE HYBRID INFLATOR

This application is the national phase under 35 U.S.C. § 371 of PCT International Application No. PCT/JP00/03960 which has an International filing date of Jun. 16, 2000, which designated the United States of America.

BACKGROUND OF THE INVENTION

1. Technical Field

This invention relates to an inflating-type safety system for motor vehicles, and more particularly to a multistage-inflating hybrid inflator capable of inflating an air bag rapidly and reducing noxious gas contained in combustion gas, and an air bag system using the same inflator.

The present invention also relates to a retainer for a gas generator, a gas generator using the same retainer, a hybrid inflator using the same gas generator, and an air bag system using the same hybrid inflator.

Furthermore, the present invention relates to a multistage-inflating hybrid inflator having ignition means in which a single initiator collar and two initiators are formed as a single member, and to an air bag system using the same hybrid inflator.

2. Description of the Prior Art

With the development of an inflator for an inflating-type safety system for motor vehicles, a hybrid inflator using both a pressurized gas and a solid gas generating agent is attracting attention. A main design requirement for a hybrid inflator is that the inflator inflates an air bag by a predetermined amount in a predetermined time so that the air bag is effectively activated. Various proposals concerning a structure to meet the requirement have heretofore been made (for example, as referred in JP-A 8-282427). Since such a hybrid inflator is designed to be installed in a motor vehicle, the weight and dimensions of the inflator, which have influence upon the weight of the motor vehicle, constitute an important design requirement therefore. Furthermore, designing an inflator capable of being manufactured easily, not having a possibility of gas leakage, and capable of reducing a noxious gas contained in a combustion gas to a low level is demanded.

U.S. Pat. No. 3,773,353 and U.S. Pat. No. 3,868,124 disclose inflators provided with two gas generating chambers. In both of these inflators, the pressures in the two gas generating chambers are at normal levels prior to actuation of the inflators, and oxygen gas is not contained in the inflators. Therefore, before putting these inflators into practical use, they have to be improved with respect to many points, i.e., a stable combustion of a gas has to be secured and the safety of a combustion gas have to be attained.

U.S. Pat. No. 5,351,988 discloses a hybrid inflator including two gas generating chambers, one of the gas generating chambers being disposed outside of an inflator housing, and pressure in the one gas generating chambers is kept at a normal level.

As a hybrid inflator, there is a single type inflator having one gas generating chamber and a dual type inflator having two gas generating chambers. The single type inflator uses a retainer for adjusting an amount of gas generating agents, and the dual type inflator uses a retainer for adjusting the dosage and for separating the two gas generating chambers from each other.

As described above, the retainer is required to have the dosage-adjusting function and the separating function of the two gas generating chambers. Especially in the case of the dual type hybrid inflator, the separating function of the two gas generating chambers is essential. In other words, when a first gas generating agent in a first gas generating chamber burns, it is important to completely eliminate a possibility such that high temperature combustion gas flows into a second gas generating chamber to burn a second gas generating agent in order to normally activate the hybrid inflator. Further, in addition to this function, it is important that the mounting operation of the retainer is simple in the industrial aspect.

SUMMARY OF THE INVENTION

An object of the present invention is to provide a multistage-inflating hybrid inflator capable of inflating an air bag rapidly, and reducing noxious gas contained in combustion gas without a weight increase of the inflator; and an air bag system using the hybrid inflator.

As described above, another object of the present invention is to provide a retainer for a gas generator in which, when it is used as a retainer for a gas generator of a hybrid inflator for example, the retainer has functions to adjust an amount of the gas generating agents and to separate the gas generating chambers, and the operation of mounting the retainer to the gas generator is facilitated.

Still another object of the present invention is to provide a gas generator using the retainer, a hybrid inflator using the gas generator, and an air bag system using the hybrid inflator.

Further another object of the present invention is to provide a multistage-inflating hybrid inflator comprising ignition means in which a single initiator collar and two initiators are fixed to be a single member, and an air bag system using the hybrid inflator.

The present invention provides a multistage-inflating hybrid inflator for a safety system of vehicles provided with an air bag, which comprises an inflator housing, a gas generator installed in the inflator housing, and an ignition means chamber joined to the gas generator, wherein the interior of the inflator housing is filled with a pressurized medium containing an inert gas, the gas generator having first and second gas generating chambers including their respective gas generating means.

Further, the present invention provides a multistage-inflating hybrid inflator for a safety system of vehicle provided with an air bag, which comprises an inflator housing, a gas generator installed in the inflator housing, and an ignition means chamber connected to the gas generator, the interior of the inflator housing being filled with a pressurized medium containing an inert gas, the gas generator having a first gas generating chamber and a second gas generating chamber storing a gas generating means, respectively, the hybrid inflator further comprising a principal closing means to close, before actuation, a flow of the pressurized medium outward to discharging port, and rupturing means for rupturing the principal closing means upon actuation, and the rupturing means actuating with increase of the internal pressure of the housing or by electric means.

In the multistage-inflating hybrid inflator of the present invention, an arrangement of the first gas generating chamber and the second gas generating chamber can appropriately be set. For example, the gas generating chambers may be arranged in series and adjacently to each other in the longitudinal direction of the inflator housing, the gas generating chambers may be arranged in series, facing each other, in the longitudinal direction of the housing, or the gas generating chambers may be aligned in parallel to each other in the lateral direction of the housing and are adjacent to or separate from each other. Among the above arrangements, the one in which the gas generating chambers are arranged in series and adjacently to each other in the longitudinal direction of the inflator housing is preferable.

In the multistage-inflating hybrid inflator of the present invention, the principal closing means for blocking a flow of the pressurized medium is provided in a gas flowpath, leading to the discharging port, of the pressurized medium of the hybrid inflator at a desired position so that the pressurized medium charged in the inflator housing may not leak before actuation. Upon actuation, the rupturing means for rupturing the principal closing means to obtain the gas flowpath is required. The rupturing means is not especially limited to a certain structure as long as the flowpath can be ensured. In the present invention, the rupturing means actuates with increase of the internal pressure of the housing or by electric means.

The rupturing means actuating with increase of the internal pressure of the inflator housing ruptures the principal closing means only by increase of the internal pressure caused by high temperature gas generated upon combustion of the gas generating means in the gas generating chamber. As the rupturing means actuated by electric means, for example, means such that the principal closing means is ruptured by actuating an electric type igniter which is disposed in the vicinity of the principal closing means, preferably disposed to face closer to the principal closing means. At that time, a booster can be used in combination if required. In either of the two rupturing means, size, strength and the like of the principal closing means are determined in view of the size, strength and the like of the principal closing means so as to reliably rupture the principal closing means to obtain the flowpath of the pressurized medium.

Further, the present invention provides a multistage-inflating hybrid inflator for a safety system of vehicle provided with an air bag, comprising an inflator housing, a gas generator installed in the inflator housing, and an igniting means chamber connected with the gas generator, the inflator housing being charged with a pressurized medium including an inert gas, the gas generator comprising a first gas generating chamber and a second gas generating chamber, each including gas generating means, the inflator further comprising principal closing means to close, before actuation, transition of the pressurized gas outward to discharging ports and a projectile to rupture the principal closing means upon actuation In the multistage-inflating hybrid inflator of the present invention, an arrangement of the first gas generating chamber and the second gas generating chamber can be set appropriately. For example, the gas generating chambers may be arranged in series and adjacently to each other in the longitudinal direction of the inflator housing, the gas generating chambers may be arranged in series, faced to each other, in the longitudinal direction of the housing, or the gas generating chambers may be aligned in parallel to each other in the lateral direction of the housing and adjacent to or separate from each other. Among the above arrangements, the one in which the gas generating chambers are arranged in series and adjacently to each other in the longitudinal direction of the inflator housing is preferable.

In the present invention, a top end of a projectile which utilizes a pressure for rupturing the principal closing means upon actuation can be disposed in the same space as a space, inside the housing, where the pressurized medium is charged.

In such a multistage-inflating hybrid inflator, the principal closing means for blocking a flow of the pressurized medium is provided in the gas flowpath, leading to the discharging port, of the pressurized medium of the hybrid inflator at a desired position so that the pressurized medium charged in the inflator housing may not leak before actuation. As the rupturing means for rupturing the principal closing means to ensure the gas flowpath upon actuation, a projectile which utilizes pressure, i.e. rupturing means such that a projectile collides against the principal closing means, can be used. The top end of the projectile is disposed in the same space as the space, inside the inflator housing, where the pressurized medium is charged. Size, strength, weight and the like of the projectile are determined in view of the size, strength and the like of the principal closing means so as to reliably rupture the principal closing means to ensure the flowpath of the pressurized medium. A guiding member for conducting the projectile to the principal closing means can be provided in order to reliably smash the principal closing means.

Further in the present invention, the top end of the projectile which utilizes pressure for rupturing the principal closing means upon actuation can be disposed in a space other than the space, inside the inflator housing, where the pressurized medium is charged.

In such a multistage-inflating hybrid inflator, the principal closing means for closing a flow of the pressurized medium is provided in the gas flowpath, leading to the discharging port, of the pressurized medium of the hybrid inflator at a desired portion so that the pressurized medium filled in the inflator housing does not leak before actuation. As the rupturing means for rupturing the principal closing means to ensure the gas flowpath upon actuation, a projectile which utilizes pressure, i.e. a rupturing means such that a projectile collides against the principal closing means, can be used. The top end of the projectile is disposed in a space (referred to as "a small space" here and naturally, a relation of volume of "large space>small space" is established) other than the space (excluding the space where the gas generator and the igniting means chamber are provided. Here, the space is referred as "a large space"), in the inflator housing, where the pressurized medium is charged. The small space can be formed with a cylindrical member for example, and the large space and the small space communicate with each other only through a predetermined number of small holes (gas-flow holes) Size, strength, weight and the like of the projectile are determined in view of the size, strength and the like of the principal closing means so as to reliably rupture the principal closing means to ensure the flowpath of the pressurized medium.

The retainer for a gas generator of the present invention is suitable for a gas generator of a hybrid inflator, and is applicable to a single type inflator having one gas generating chamber, a dual type inflator having two gas generating chambers, and an inflator having more than three gas generating chambers.

The present invention provides a retainer for a gas generator disposed in the gas generator having one or more gas generating chambers, wherein the retainer is made of a cylindrical member having one end closed and the other end open.

Side walls of the retainer for a gas generator may have a constant length or different lengths in part. Or one side wall of the retainer may be longer than the side wall being opposite thereto. By appropriately adjusting the length of the side walls in this manner, the desired separating function and/or dosage-adjusting function can be exhibited in accordance with states such as shapes of the gas generating chambers.

Further, the present invention provides a gas generator comprising the retainer for a gas generator which is disposed in one or two or more gas generating chambers, wherein an outer side wall of the retainer is in contact with an inner side wall of the gas generating chamber, and a gas generating chamber is divided into at least two chambers in the longitudinal direction by means of closed end of the retainer.

The separation needs to be such that flame generated in one gas generating chamber isolated by the retainer may not transfer to the other. Such a separated state is referred as "a flame-preventing state" hereinafter. The retainer is disposed to separate the chambers in the "flame-preventing state", and at the same time, it functions to retain a gas generating agent and/or to adjust an amount of the gas generating agents.

Further, the present invention provides a gas generator having the retainer for a gas generator disposed in one or two or more gas generating chambers, wherein the retainer is disposed to retain the gas generating agent and/or to adjust an amount of the gas generating agents, an outer side wall of the retainer is in contact with an inner side wall of the gas generating chamber, and a volume of the gas generating chamber is controlled by the closed end of the retainer.

In the present invention, the retainer is disposed in order to retain the gas generating agent and/or to adjust the dosage, and by appropriately moving and disposing the retainer in the longitudinal direction to adjust the volume of the gas generator, the above functions can be obtained.

In the above gas generator, at least two retainers for a gas generator can be disposed so that the open ends thereof may be arranged in the same direction.

The present invention provides a retainer for a gas generator disposed in the gas generator having one or two or more gas generating chambers, wherein the retainer is a combination of a larger-diameter cylinder having one end closed and the other end open and a smaller-diameter cylinder being integrated with the larger-diameter cylinder to project toward the inside as well as the open end of the larger-diameter cylinder.

In the retainer for a gas generator, a side-wall lengths of the larger-diameter cylinder and the smaller-diameter cylinder may be the same as or different from each other. Or in the retainer for a gas generator, a side-wall length of the larger-diameter cylinder may be longer or shorter than a side wall length of the smaller-diameter cylinder. By appropriately adjusting the side wall lengths of the larger-diameter cylinder and the smaller-diameter cylinder in the above-described manner, the desired separating function and/or dosage-adjusting function can be exhibited in accordance with states such as shapes of the gas generating chambers.

Further, the present invention provides a gas generator in which the retainer for a gas generator is disposed and one or two or more gas generating chambers are provided around a charge-transferring chamber, wherein the retainer is fitted into the charge-transferring chamber at the open end of the smaller-diameter cylinder, an outer side wall of the larger-diameter cylinder of the retainer is in contact with an inner side wall of the gas generating chamber, an inner side wall of the smaller-diameter cylinder is in contact with an outer side wall of the charge-transferring chamber, and a gas generating chamber is divided into at least two chambers in the longitudinal direction by the closed end in the flame-preventing state.

Further, the present invention provides a gas generator in which the retainer for a gas generator is disposed and one or two or more gas generating chambers are provided around a charge-transferring chamber, wherein the retainer is disposed in order to retain the gas generating agent and/or for to adjust the dosage, the retainer is fitted into the charge-transferring chamber at an open end of the smaller-diameter cylinder, an outer side wall of the larger-diameter cylinder of the retainer is in contact with an inner side wall of the gas generating chamber, an inner side wall of the smaller-diameter cylinder is in contact with an outer side wall of the charge-transferring chamber, and a volume of the gas generating chamber is controlled.

In the above gas generator, at least two retainers can be disposed so that open ends thereof may be arranged in the same direction. The at least two retainers may have the same specifications (the same shape, size, material and the like), or different specifications. However, the retainers in the same specifications are preferable because production can be facilitated, producing time can be shortened, and assembling operation can be more efficient.

The present invention provides a hybrid inflator for an inflating type safety system for vehicles provided with an air bag, which comprises an inflator housing, a gas generator installed in the inflator housing, and an ignition means chamber provided with ignition means which is connected to the gas generator, wherein the gas generator is the above-described gas generator.

In the above hybrid inflator, when the gas generator includes a first gas generating chamber and a second gas generating chamber disposed in series and adjacently to each other, a retainer for separating the first and second gas generating chambers in the flame-preventing state can be disposed with an open end thereof facing the first gas generating chamber.

By disposing the retainer with an open end thereof facing the first gas generating chamber in the above manner, in other words, by disposing the retainer with a closed end thereof facing the second gas generating chamber, the retainer is deformed so as to push and broaden the side wall portion thereof outwardly when the open portion of the retainer receives a pressure caused by combustion of the first gas generating agent in the first gas generating chamber. Therefore, the flame-preventing states of the first and second gas generating chambers are maintained, and consequently, an erroneous actuation caused by combustion of the second gas generating due to combustion of the first gas generating agent is prevented.

The present invention also provides a multistage-inflating hybrid inflator for a safety system of a vehicle provided with an air bag, which comprises an inflator housing, a gas generator provided in the inflator housing and ignition means chamber provided with an ignition means which is connected with the gas generator, wherein the interior of the inflator housing is filled with a pressurized medium containing an inert gas, the gas generator has a first gas generating chamber and a second gas generating chamber, each including a gas generating means, and further the ignition means comprises two initiators fixed in one initiator collar.

The igniting means of the present invention can be formed in such a manner that an inner shape of initiator collar is previously formed into the same shape as an outer shape of each of the two initiators, and the two initiators are fitted into the initiator collar. With the ignition means having the two initiators fixed in the one initiator collar in the above manner, the initiator collar and the two initiators become a single member and thus, the process of mounting the igniting means to the inflator housing is facilitated.

Further, by fixing two initiators into one initiator collar with resin to form the igniting means of the single member, the assembling process of the igniting means and the mounting process of the igniting means to the inflator housing are facilitated. In the present invention, it is not necessary to correspond the inner shape of the initiator collar to the outer shape of two initiators.

In the hybrid inflator of the present invention, as will be described later, the gas generating means which are the first gas generating agent accommodated in the first gas generating chamber and the second gas generating agent accommodated in the second gas generating chamber, or the gas generating means which is the gas generating agent accommodated in a single gas generating chamber can be determined in relation with composition of the pressurized medium stored into the inflator housing.

When the pressurized medium has a composition comprising an inert gas such as oxygen, argon, and helium (nitrogen is also included in the inert gas in the present invention), the oxygen works so as to convert carbon monoxide and hydrogen generated due to the combustion of a gas generating agent as gas generating means into carbon dioxide and water vapor: argon works so as to promote the thermal expansion of the pressurized medium. It is preferable to contain helium in the pressurized medium since the leakage of the pressurized medium can be detected easily, and consequently distribution of imperfect products can be prevented. A charging pressure of the pressurized medium (=pressure inside the inflator housing) is preferably 10,000 to 70,000 kPa and more preferably, 30,000 to 60,000 kPa. The pressurized medium may or may not include oxygen, and when oxygen is included, it is preferable that the maximum amount is 30 mol %.

As the first gas generating agent accommodated in the first gas generating chamber and the second gas generating agent accommodated in the second gas generating chamber, a gun propellant can be used for example. As the gun propellant, a single-base gun propellant, a double-base gun propellant and a triple-base gun propellant can be used. In addition to these propellants, it is possible to use a gun propellant obtained by mixing a secondary explosive, a binder, a plasticizer, a stabilizer and the like, and molding the resultant mixture in a desired shape.

The secondary explosive may include hexahydrotrinitrotriazine (RDX), cyclotetramethylene tetranitramine (HMX), pentaerithritol tetranitrate (PETN), and triaminoguanidine nitrate (TAGN). For example, when a gas generating agent using RDX as a secondary explosive is burnt in an oxygen-absent atmosphere under a pressure of 20,670 kPa and at a combustion temperature of 3348 K, formed gas is of a combustion gas comprises 33 mol % of nitrogen, 25 mol % of carbon monoxide, 23 mol % of water vapor, 8 mol % of carbon dioxide and other gas components.

The bonding agent may include cellulose acetate, cellulose acetate butylate, cellulose acetate propiolate, ethyl cellulose, polyvinyl acetate, azide polymer, polybutadiene, hydrogenated polybutadiene, and polyurethane; the plasticizer may comprise trimethylolethane trinitrate, butantriol trinitrate, nitroglycerine, bis (2,2-dinitropropyl) acetal/formal, glycidyl azide, and acetyltriethyl citrate and the like; and the stabilizer may comprise ethlcentralite, diphenylamine, and resocinol.

In a preferable ratio of the secondary explosive to the binder, plasticizer and stabilizer, secondary explosive is about 50 to 90 wt. % and the binder, plasticizer and stabilizer in all are about 10 to 50 wt. %.

It is difficult in some cases to burn the gas generating agent of the above-described composition under normal pressure. However, in the hybrid inflator according to the present invention, the interior thereof is maintained at a high pressure in advance, the gas generating agents can be burnt stably and smoothly.

In addition, as the first gas generating agent accommodated in the first gas generating chamber and the second gas generating agent accommodated in the second gas generating chamber, for example, it is possible to use a material including fuel and oxidizing agent, or fuel, oxidizing agent and slag-forming agent, being mixed with binder if required, and formed into a desired shape. If such a gas generating agent is used, a gas generated by combustion of the agent can be used for developing the air bag together with the pressurized medium. Especially when the gas generating agent including the slag-forming agent is used, an amount of mist discharged from the inflator can be largely reduced.

Preferably, the fuel can be one or two or more selected from guanidine derivative such as nitroguanidine (NQ) guanidine nitrite (GN), guanidine carbonate, amino nitroguanidine, amino guanidine nitrite, amino guanidine carbonate, diamino guanidine nitrite, diamino guanidine carbonate, and triamino guanidine nitrite. As the fuel, one or two or more materials selected from a group comprising tetrazole and tetrazole derivative can be used.

As the oxidizing agent, one or more materials selected from a group comprising strontium nitrate, potassium nitrate, ammonium nitrate, potassium perchlorate, copper oxide, ferrous oxide, a basic copper nitrate are preferably used. A preferable amount of the oxidizing agent is 10 to 80 parts by weight, and more preferably, 20 to 50 parts by weight with respect to 100 parts by weight of the fuel.

As the slag-forming agent, one or more materials selected from a group comprising acid clay, talc, bentonite, diatomaceous earth, kaolin, silica, alumina, sodium silicate, silicon nitride, silicon carbide, hydrotalsite, and a mixture thereof are preferably used. A preferable amount of the slag-forming agent is 0 to 50 parts by weight, and more preferably, 1 to 10 parts by weight with respect to 100 parts by weight of the fuel.

As the bonding agent, one or more materials selected from a group comprising sodium salt of sodium carboxymethylcellulose, hydroxyethyl cellulose, starch, polyvinyl alcohol, guar gum, microcrystal cellulose, polyacrylamide, and calcium stearate are preferably used. A preferable amount of binder is 0 to 30 parts by weight, and more preferably, 3 to 10 parts by weight with respect to 100 parts by weight of the fuel.

The present invention further provides an air bag system comprising an activation signal-outputting means including an impact sensor and a control unit, and a module case in which the above-described multistage-inflating hybrid inflator and an air bag are accommodated, wherein an inflating rate of the air bag can be controlled.

In the present invention, the term "a gas generator" means a unit having a gas generating function of generating a high temperature combustion gas due to combustion of the gas generating means (gas generating agent) stored in the gas generator housing (gas generating chamber), thereby allowing the high temperature combustion gas to flow into the inflator housing. The hybrid inflator includes the gas generator inside an inflator housing thereof.

The above-described structures and functions can be combined with one another to practice the present invention.

Since the hybrid inflator of the present invention includes the two gas generating chambers, it is possible to inflate and develop the air bag smoothly and reliably, thereby enhancing safety. Further, since the interior is maintained at a high pressure, combustion of the gas generating agent is stabilized. Even when two gas generating chambers are provided, an increase in volume and weight of the hybrid inflator can be minimized by adjusting the arrangement of the two gas generating chambers.

The hybrid inflator comprising the gas generator which uses the retainer for a gas generator of the present invention eliminates a possibility of erroneous actuation, and the reliability of the product can be enhanced.

DESCRIPTION OF PREFERRED EMBODIMENTS

(1) Embodiments 1 and 2

Figure 1:
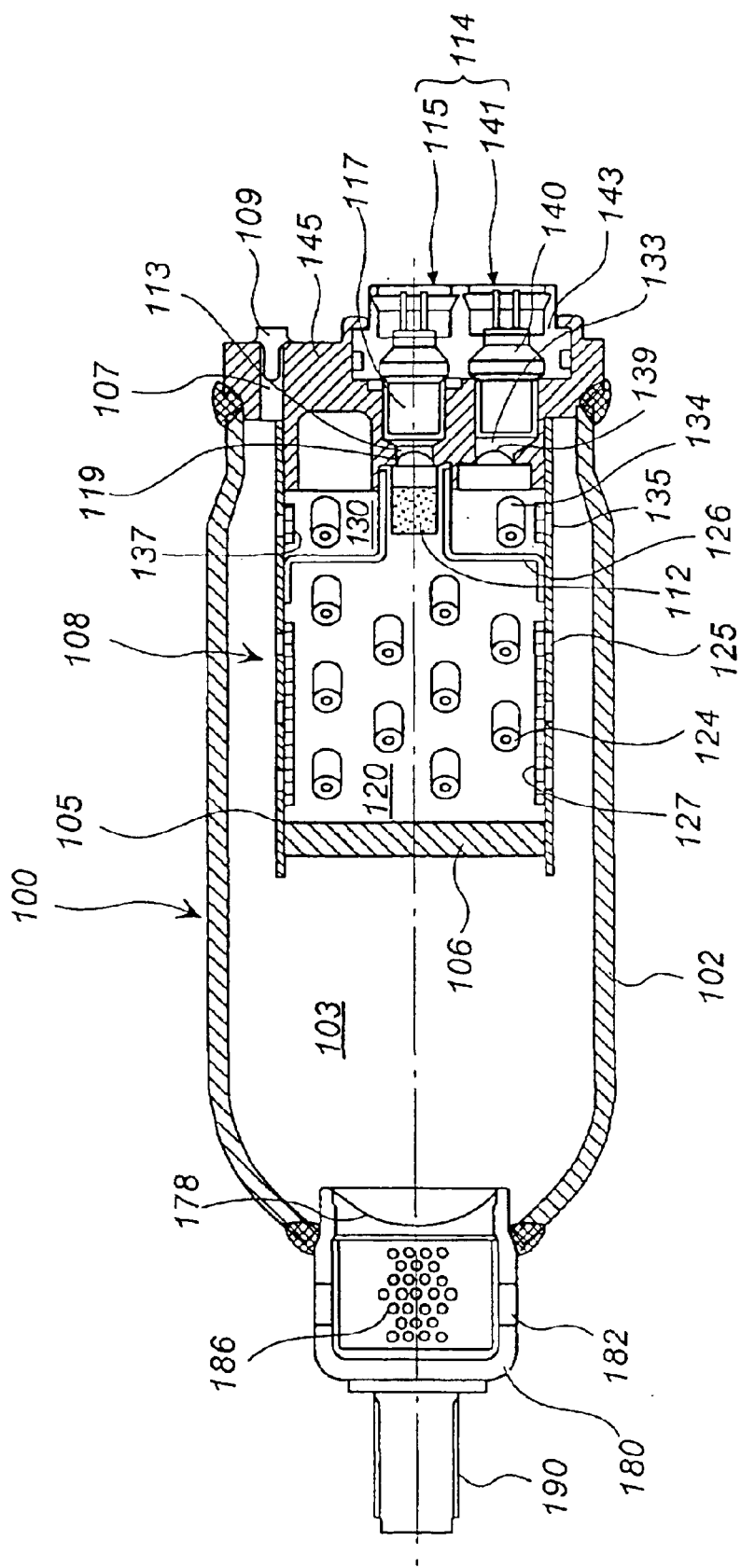
FIG. 1 is a cross-sectional view showing an embodiment of a hybrid inflator of the present invention.
Figure 2:
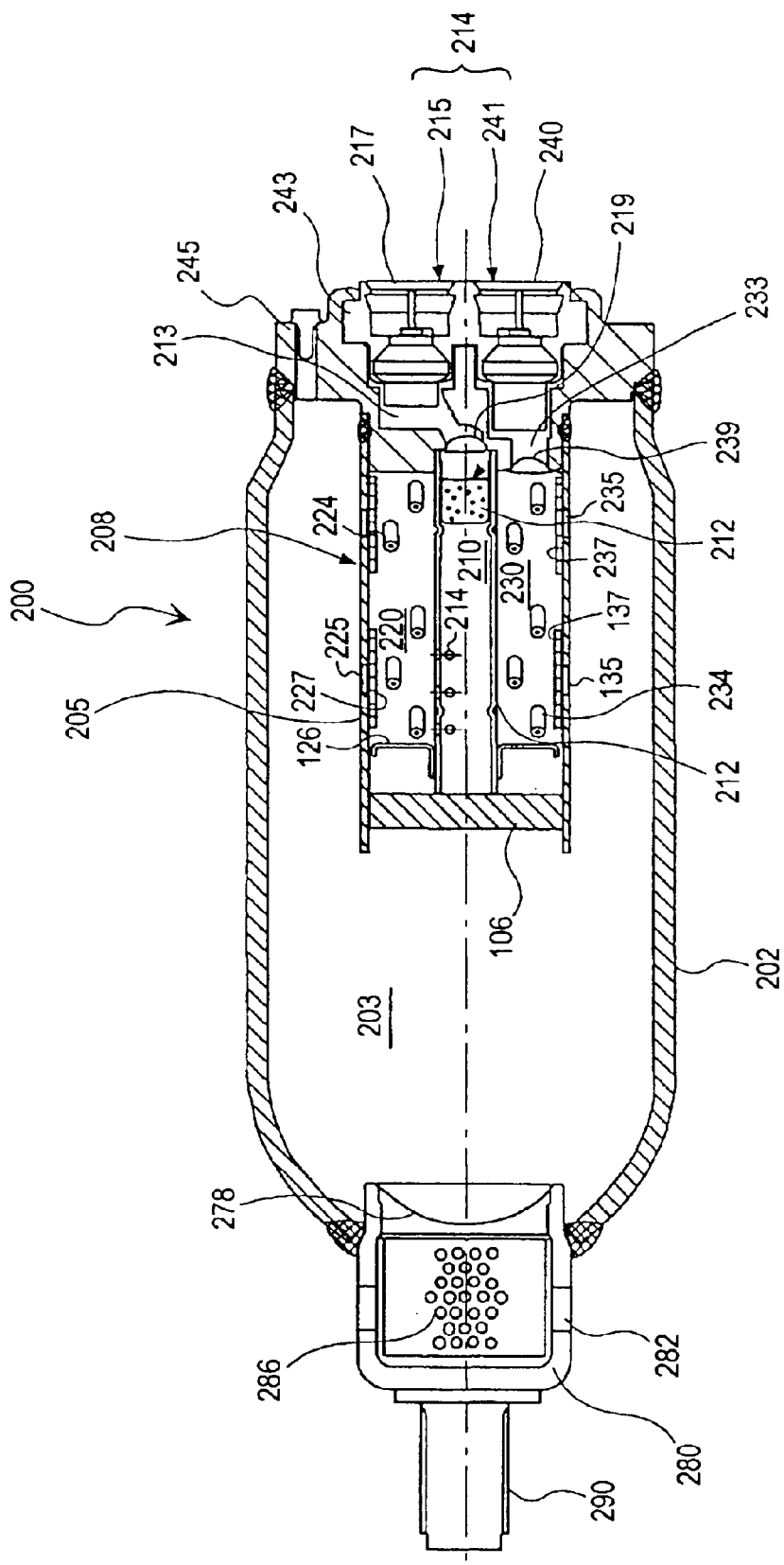
FIG. 2 is a cross-sectional view showing another embodiment of the hybrid inflator of the present invention.

The present invention will be explained in detail with reference to the drawings showing embodiments. FIG. 1 is a sectional view of a hybrid inflator 100 in its longitudinal direction. FIG. 2 is a sectional view of a hybrid inflator 200 of another embodiment in its longitudinal direction.

First, a hybrid inflator shown in FIG. 1 will be explained. As shown in FIG. 1, an inflator housing 102 comprises a cylindrical pressure resisting container, and an inner space 103 is filled with a pressurized medium and maintained at a high pressure.

The pressurized medium is usually charged from a small hole 107 formed in a boss 145 joined to one end portion of the inflator housing 102, and the small hole is closed with a sealing pin 109 after the inflator housing has been filled with the pressurized medium.

A gas generator 108 comprises a first gas generating chamber 120 and a second gas generating chamber 130. The first gas generating chamber 120 comprises a cylindrical gas generator housing 105, a partition wall 106 and a partition wall 126 having a function to adjust an amount of the gas generating agents. The second gas generating chamber 130 comprises the gas generator housing 105, the partition wall 126 and a boss 145. The gas generator 108 is disposed in an inflator housing 102, and one end of the gas generator 108 in the longitudinal direction is fixed to the boss 145 by welding.

A required amount of first gas generating agent 124 is stored in the first gas generating chamber 120. The first gas generating chamber 120 and the inflator housing 102 are in communication with each other through a communication hole 125 provided with a screen 127 therebetween. Charge-transferring means comprising a booster (a transfer charge) 112 filled in a booster cup is provided with the first gas generating chamber 120. A first igniting initiator 117 is functionally connected to the first gas generating chamber 120 through a first rupturable disc 119 of a first closing means.

A required amount of a second gas generating agent 134 is stored in the second gas generating chamber 130. The second gas generating chamber 130 and the inflator housing 102 are in communication with each other through a communication hole 135 provided with a screen 137 therebetween. A second igniting initiator 140 is functionally connected to the second gas generating chamber 130 through a second rupturable disc 139 of a second closing means.

As described above, the first gas generating chamber 120 and the second gas generating chamber 130 are formed so as to have independent gas flowpaths, respectively, through which gases generated by combustion of the first gas generating agent 124 and the second gas generating agent 134 in the respective chambers 120 and 130 flow into the inflator housing 102. Namely, a gas generated in the first gas generating chamber 120 flows into the inflator housing 102 through the communication hole 125 via the screen 127, and a gas generated in the second gas generating chamber 130 flows into the inflator housing 102 through the communication hole 135 via the screen 137.

The first gas generating chamber 120 and the second gas generating chamber 130 are disposed in series and adjacent to each other in a longitudinal direction of the inflator housing 102. The first gas generating chamber 120 and the second gas generating chamber 130 may be disposed in the reverse order.

The amount of the second gas generating agent 134 may be equal to, or larger or smaller than that of the first gas generating agent 124. The size, shape, and composition of the second gas generating agent may be the same as or different from those of the first gas generating agent. Additionally, volumes of the first gas generating chamber 120 and the second gas generating chamber 130 may be the same as or different from each other.

As described above, the first gas generating chamber 120 is in communication with the inflator housing 102, and the second gas generating chamber 130 is in communication with the inflator housing 102. Therefore, interior of the first and second gas generating chambers, 120 and 130 are all maintained at a high pressure, i.e., at the same pressure as the interior (an inner space 103) of the inflator housing 102.

An igniting means chamber 114 is formed in the boss 145, the first igniting initiator 117 is accommodated in a first ignition chamber 115, and the second igniting initiator 140 is accommodated in a second ignition chamber 141. The first igniting initiator 117 and the second igniting initiator 140 are fixed to an initiator collar 143 and mounted to the boss 145. The first igniting initiator 117 and the second igniting initiator 140 are aligned in parallel with and adjacent to each other in a lateral direction of the inflator housing 102.

The first ignition chamber 115 and the first gas generating chamber 120 are in communication with each other through a first communication hole 113. Before actuation of the first igniting means, the first communication hole 113 is closed with the first rupturable disc 119 of the first closing means. The second ignition chamber 141 and the second gas generating chamber 130 are in communication with each other through a second communication hole 133. Before actuation of the igniting means, the second communication hole 133 is closed with the second rupturable disc 139 of the second closing means.

A diffuser 180 is connected to the other end of the inflator housing 102. The diffuser 180 includes a plurality of diffuser ports 182 for introducing the pressurized medium into the air bag, and a diffuser screen 186 for removing fine particles. A principal rupturable disc 178 of a principal closing means is provided with inside the diffuser 180 on the side of the inflator housing. A stud bolt 190 for connecting the diffuser 180 to an air bag module is fixed to the outer face of the diffuser 180 by welding. The principal rupturable disc 178 is to be ruptured by an increase of internal pressure of the inner space 103 upon actuation.

Next, the hybrid inflator 200 of another embodiment will be explained based on FIG. 2. The hybrid inflator 200 shown in FIG. 2 is different from the hybrid inflator 100 shown in FIG. 1 only in the arrangement of the two gas generating chambers.

The first gas generating chamber 220 and the second gas generating chamber 230 are arranged symmetrically in the lateral direction, inserting a charge-transferring chamber 210 therebetween. Therefore, a cross section in the lateral direction of the first gas generating chamber 220 and the second gas generating chamber 230 is in a doughnut-like shape, and the charge-transferring chamber 210 is located at the portion which corresponds to a hole of the doughnut. The first gas generating chamber 220 and the second gas generating chamber 230 have shapes like a doughnut divided into two pieces of the same or different volumes.

The charge-transferring chamber 210 comprises a cylindrical housing 212, and is connected to a first igniting initiator 217 through the first rupturable disc 219 of the first closing means and the booster cup in which the booster (a transfer charge) 212 is charged. Since the charge-transferring chamber 210 is in communication only with the first gas generating chamber 220 through the port 214, when the first igniting initiator 217 is actuated to burn the booster 212, only the first gas generating agent 224 in the first gas generating chamber 220 is burnt.

The first gas generating chamber 220 and the inflator housing 202 (a space 203) are in communication with each other through a communication hole 225 provided with a screen 227 therebetween, and the second gas generating chamber 230 and the inflator housing 202 (the space 203) are in communication with each other through a communication hole 235 provided with a screen 237 therebetween. The communication holes 225 and 235 are formed on the opposite sides in the lateral direction.

Next, the operation of the hybrid inflator 100 will be explained with reference to FIG. 1. Before the hybrid inflator 100 is activated, the pressurized medium charged in the inflator housing 102 under a high pressure has flowed into the first gas generating chamber 120 and the second gas generating chamber 130 which are in communication through the communication holes 125 and 135, respectively, and the pressurized medium is maintained at the same high pressure.

When a vehicle collides, the first igniting initiator 117 is ignited by activation signal-outputting means to rupture the first rupturable disc 119, and then ignites and burns the booster 112, thereby generating a high-temperature booster gas. The high-temperature booster gas flows into the first gas generating chamber 120 and then ignites and burns the first gas generating agent 124 to generate a required amount (an amount corresponding to the charged amount of the first gas generating agent 124) of a high-temperature combustion gas. At that time, the first gas generating chamber 120 is in communication with the inner space 103 in which the pressurized medium is charged, and is maintained at high pressure, therefore, the combustion of the first gas generating agent 124 is stable. Since the first gas generating chamber 120 and the second gas generating chamber 130 are separated from each other by the partition wall 126, and the communication holes 125 and 135 are arranged as described above, the second gas generating agent 134 is not ignited and burnt by the combustion of the first gas generating agent 124.

Thereafter, the high-temperature combustion gas flows into the inflator housing 102 from the communication hole 125 to increase the pressure in the housing 102, and the principal rupturable disc 178 which is the principal closing means is ruptured by this increase of the internal pressure. Thus, the pressurized medium is ejected from the diffuser port 182, after passing through the diffuser screen 186, to inflate the air bag mounted in the air bag module.

The second igniting initiator 140 is ignited by the activation signal-outputting means simultaneously with or slightly after the first igniting initiator 117 is activated, thereby rupturing the second rupturable disc 139 to ignite the second gas generating agent 134 in the second gas generating chamber 130, and a required amount (an amount corresponding to the charged amount of the second gas generating agent 134) of high-temperature combustion gas is generated. At that time, the second gas generating chamber 130 is in communication with the inner space 103 in which the pressurized medium is charged, and is maintained at high pressure, therefore, the combustion of the second gas generating agent 134 is stable.

The difference in activating timings ("staggered activating timings" hereinafter) between the first igniting initiator 117 and the second igniting initiator 140 is set in relation to a degree of impact to the vehicle mounted with the air bag system so that a passenger can be protected appropriately. When a vehicle undergoes a small impact, only the first igniting initiator 117 is activated (in other words, only the first gas generating agent 124 is ignited and burnt), and when a vehicle undergoes a medium impact, the first igniting initiator 117 is activated (in other words, the first gas generating agent 124 is ignited and burnt) and then slightly thereafter, the second igniting initiator 140 is activated (in other words, the second gas generating agent 134 is ignited and burnt). When a vehicle undergoes a large impact, both the first and second igniting initiators 117 and 140 are activated at the same time (in other words, both the first and second gas generating agents 124 and 134 are ignited and burnt at the same time). Practically, the staggered activating timings is set to about 0 to 50 msec in order to protect a passenger against a small impact to a great impact.

When the second igniting initiator 140 was activated, the high-temperature combustion gas generated by the combustion of the second gas generating agent 134 flows into the inflator housing 102 from the communication hole 135 to increase a pressure therein, and the gas is ejected from the diffuser port 182 together with the remaining pressurized medium to further inflate the air bag. By generating the combustion gas in two stages in accordance with a degree of impact on the vehicle in this manner, a delayed start of an air bag's inflating action at the time of a vehicle collision can be prevented by the combustion of the first gas generating agent 124, and the pressurized medium can be discharged completely from the inflator housing 102 by the combustion of the second gas generating agent 134 to inflate the air bag immediately up to a satisfying safety level.

When a vehicle undergoes a small impact and only the first igniting initiator 117 is activated, in a view of securing safety at the time of withdrawing the air bag system later, the second igniting initiator 140 is activated at about 100 msec after the first igniting initiator 117 has been activated in order to burn the remaining second gas generating agent 134. In the hybrid inflator of the present embodiment, except when the second igniting initiator 140 is activated, the second gas generating chamber 130 is never ignited within a period between about 0 to 120 msec after the first gas generating agent 124 has been ignited and burnt by activation of the first igniting initiator 117.

In addition, since two gas generating chambers are provided, this hybrid inflator can also be adapted to a mode of embodiment such that a combustion gas can be generated exclusively in the first gas generating chamber 120, a mode of embodiment such that a combustion gas can be generated in the first and second gas generating chambers, 120 and 130 simultaneously, and a mode of embodiment such that an interval between the times of generating respective combustion gases in the first gas generating chamber 120 and the second gas generating chamber 130 can be adjusted optionally.

(2) Embodiments 3 and 4

Figure 3:
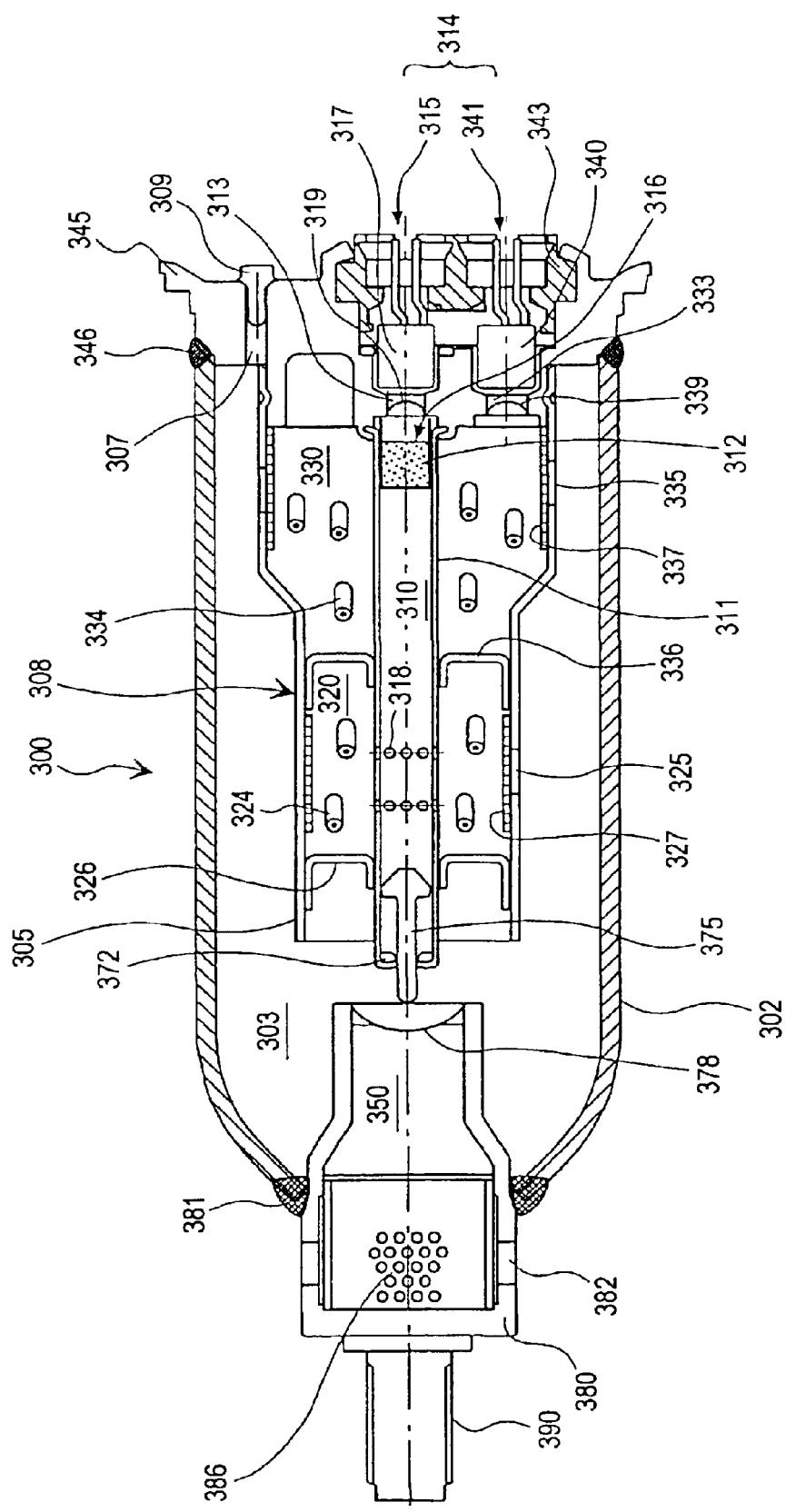
FIG. 3 is a cross-sectional view showing another embodiment of the hybrid inflator of the present invention.
Figure 4:
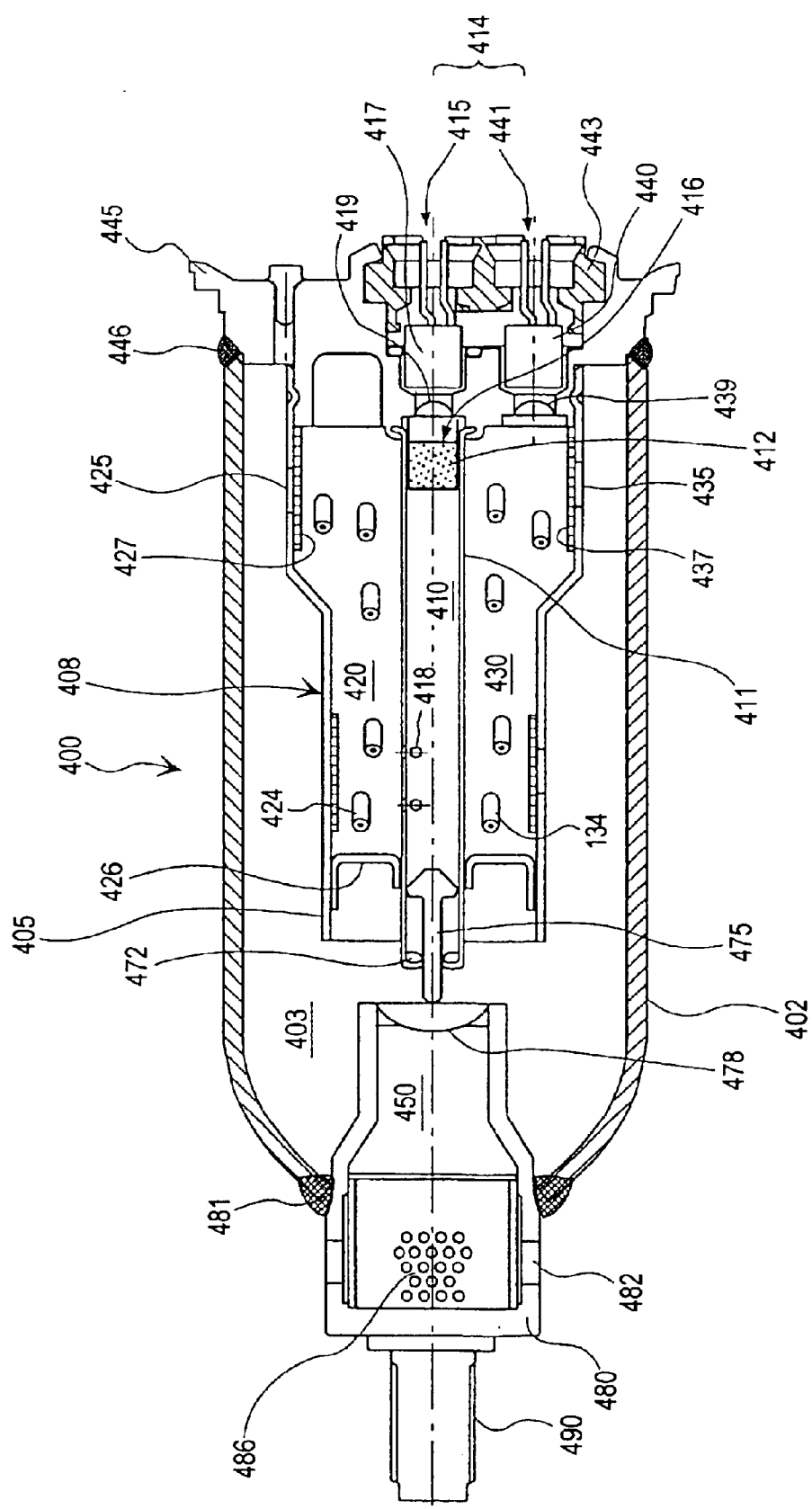
FIG. 4 is a cross-sectional view showing another embodiment of the hybrid inflator of the present invention.

The present invention will be explained in detail with reference to the drawings showing other embodiments. FIG. 3 is a sectional view of a hybrid inflator 300 in the longitudinal direction thereof. FIG. 4 is a sectional view of a hybrid inflator 400 of another embodiment in the longitudinal direction thereof.

The hybrid inflator 300 will be explained based on FIG. 3. As shown in FIG. 3, an inflator housing 302 comprises a cylindrical pressure resisting container, and the inner space 303 thereof is filled with a pressurized medium and maintained at a high pressure. The pressurized medium is usually charged from a small hole 307 formed in a boss 345 connected to one end of the inflator housing 302, and the small hole 307 is closed with a seal pin 309 after the pressurized medium has been charged. The inflator housing 302 can be formed to have a shape such that the outer shape thereof except for a portion in the vicinity of the end portion on the diffuser 380 side has the same outer-diameter (a outer shape which is even without constriction or the like).

A gas generator 308 includes a charge-transferring chamber 310 which is surrounded by a first gas generating chamber 320 and a second gas generating chamber 330 arranged in series and adjacently to each other in the longitudinal direction of the inflator housing 302. The gas generator 308 is disposed in the inflator housing 302, and one end thereof in the longitudinal direction is fixed to the boss 345 by welding.

The charge-transferring chamber 310 comprises a cylindrical housing 311, and is connected to a first igniting initiator 317 through a booster cup 316 in which a booster (a transfer charge) 312 is stored and a first communication hole 313 closed by a first rupturable disc 319 of a first closing means. The charge-transferring chamber 310 is in communication with a first gas generating chamber 320 through communication holes 318.

The first gas generating chamber 320 is arranged to surround the charge-transferring chamber 310, and comprises a cylindrical housing 305, the housing 311 of the charge-transferring chamber 310, a first partition wall 326 and a second partition wall 336. A required amount of a first gas generating agent 324 is accommodated as a gas generating means in the first gas generating chamber 320. The first gas generating chamber 320 and the inflator housing 302 are in communication with each other through a communication hole 325 provided with a screen 327 therebetween.

The second gas generating chamber 330 comprises a cylindrical housing 305, a housing 311 of the charge-transferring chamber 310, a second partition wall 336, and the boss 345 (and a second rupturable disc 339). A required amount of second gas generating agent 334 is accommodated as gas generating means in the second gas generating chamber 330. The second gas generating chamber 330 and the inflator housing 302 are in communication with each other through a communication hole 335 provided with a screen 337 therebetween.

The amount of the second gas generating agent 334 may be set equal to, or larger or smaller than that of the first gas generating agent 324. Size, shape, and composition of the second gas generating agent 334 may be the same as or different from those of the first gas generating agent 324. Volumes of the first gas generating chamber 320 and the second gas generating chamber 330 may be the same as or different from each other, and the volumes can be adjusted by the partition walls 326 and 336.

As described above, the charge-transferring chamber 310 is in communication with the first gas generating chamber 320, the first gas generating chamber 320 is in communication with the inflator housing 302, and the second gas generating chamber 330 is in communication with the inflator housing 302. Therefore, the interiors of the first and second gas generating chambers, 320 and 330 and the charge-transferring chamber 310 are all maintained at a high pressure, i.e., at the same pressure as the interior (the inner space 303) of the inflator housing 302.

The first gas generating chamber 320 and the second gas generating chamber 330 are arranged in series and adjacent to each other in the longitudinal direction of the inflator housing 302. By arranging the chambers in series in this manner, even if the two gas generating chambers are provided, the overall size of the hybrid inflator can be made compact and the weight of the hybrid inflator can be minimized.

The first gas generating chamber 320 and the second gas generating chamber 330 are formed so as to have independent gas flowpaths, respectively, through which gases generated by combustion of the first gas generating agent 324 and the second gas generating agent 334 in the respective chambers, 320 and 330 flow into the inflator housing 302. Namely, a gas generated in the first gas generating chamber 320 flows into the inflator housing 302 through the communication hole 325 via the screen 327, and a gas generated in the second gas generating chamber 330 flows into the inflator housing 302 through the communication hole 335 via the screen 337.

The first gas generating chamber 320 and the second gas generating chamber 330 may be disposed in the reverse order.

The second gas generating chamber 330 is connected to the second igniting initiator 340 through the second communication hole 333 closed by the second rupturable disc 339 of the second closing means.

The igniting means chamber 314 formed in the boss 345 includes a first ignition chamber 315 and a second ignition chamber 341. The first ignition chamber 315 accommodates the first igniting initiator 317 therein, and the second ignition chamber 341 accommodates the second igniting initiator 340 therein. The first and second ignition chambers 315 and 341 can be aligned in parallel and adjacent to each other in the lateral direction of the inflator housing 302.

The first igniting initiator 317 and the second igniting initiator 340 are mounted to the boss 345 through an initiator collar 343. The boss 345 is fixed to the inflator housing 302 at a connecting portion 346 by welding or the like.

A projectile 375 having the illustrated shape for rupturing a principal rupturable disc 378 at the time of actuation is mounted to one end of the charge-transferring chamber 310 so that the projectile 375 straddles the charge-transferring chamber 310 and the inner space 303 of the inflator housing 302 through an O-ring 372. As illustrated, a top end of the projectile 375 (a portion of the projectile 375 in vicinity of the principal rupturable disc 378) is located in the inner space 303.

A diffuser 300 is connected to one end of the inflator housing 302. The diffuser 380 is fixed at a connecting portion 381 by welding. The principal rupturable disc 378 of the principal closing means for blocking a flowpath to a diffuser port of the pressurized medium before actuation is disposed on one end of the diffuser 380, being opposite to the projectile 375. Therefore, before actuation, a gas-flow space 350 and the inner space 303 of the inflator housing 302 are completely separated and isolated from each other by the principal rupturable disc 378 and a flow of the pressurized medium is, therefore, prevented.

On the other end of the diffuser 380, a plurality of diffuser ports 382 for introducing the pressurized medium to the air bag and a diffuser screen 386 for removing fine particle are provided. A stud bolt 390 for connecting the inflator to the air bag module is fixed to the outer surface of the diffuser 380 by welding.

In the hybrid inflator 300, it is preferable that the above-described constituent elements are arranged symmetrically in the lateral direction with respect to the center axis (shown as a dotted line in FIG. 3), but some or all of the constituent elements may be arranged eccentrically with respect to the center axis.

In the hybrid inflator of the present invention, the arrangement of the first and second gas generating chambers can be changed appropriately as described below.

For example, the first gas generating chamber 320 and the second gas generating chamber 330 can be arranged on both ends of the inflator housing 302, respectively, so as to face each other inside the housing. In this case, the pressurized medium is charged into the space between the first gas generating chamber 320 and the second gas generating chamber 330.

Further, for example, in the inflator housing 302, the first gas generating chamber 320 (or the second gas generating chamber 330) may be arranged to surround the charge-transferring chamber 310, and the second gas generating chamber 330 (or the first gas generating chamber 320) may be arranged to surround the first gas generating chamber 320.

An embodiment of another arrangement of the first and second gas generating chambers will be explained based on FIG. 4. The hybrid inflator 400 shown in FIG. 4 is different from the embodiment shown in FIG. 3 only in the arranging positions of the first gas generating chamber 420 and the second gas generating chamber 430 and other structure is the same as that of the embodiment shown in FIG. 3. Therefore, a description of the structure other than the first gas generating chamber 420 and the second gas generating chamber 430 is omitted.

The first gas generating chamber 420 and the second gas generating chamber 430 are arranged symmetrically in the lateral direction provided with a charge-transferring chamber 410 therebetween. Therefore, a cross section in the lateral direction of the first gas generating chamber 410 and the second gas generating chamber 430 is in a doughnut-like shape, and the charge-transferring chamber 410 is located at the portion which corresponds to a hole of the doughnut. The first gas generating chamber 420 and the second gas generating chamber 430 have shapes like a doughnut divided into two pieces of the same or different volumes. The communication hole 418 of the charge-transferring chamber 410 is in communication only with the first gas generating chamber 420, and therefore, when the first igniting initiator 417 is ignited, only the first gas generating agent 424 in the first gas generating chamber 420 is burnt.

The first gas generating chamber 420 and the inflator housing 402 (a space 403) are in communication with each other through a communication hole 425 provided with a screen 427 therebetween, and the second gas generating chamber 430 and the inflator housing 402 (the space 403) are in communication with each other through a communication hole 435, inserting a screen 437. The communication holes 425 and 435 are formed on the opposite sides in the lateral direction.

Next, the operation of the hybrid inflator 300 will be explained with reference to FIG. 3. Before the hybrid inflator 300 is activated, the pressurized medium charged in the inflator housing 302 under a high pressure has flowed into the first gas generating chamber 320 and the second gas generating chamber 330 which are in communication through the communication holes 325 and 335, respectively, and also flows into the charge-transferring chamber 310 through the communication hole 318, and the pressurized medium is maintained at the same high pressure. Further, the projectile 375 is mounted so as to straddle between the charge-transferring chamber 310 and the inner space 303 which are maintained at the same pressure, and thus an erroneous actuation is prevented.

When a vehicle collides, the first igniting initiator 317 is ignited by activation signal-outputting means to rupture the first rupturable disc 319 (fixed to the boss 345 forming the first communication hole 313) to ignite and burn the booster 312 in the charge-transferring chamber 310, thereby generating a high-temperature booster gas.

When the pressure in the charge-transferring chamber 310 is increased by the generated booster gas, the projectile 375 pushed by this pressure moves to rupture the principal rupturable disc 378 with the sharp top end thereof.

The booster gas flows into the first gas generating chamber 320 from the communication hole 318 to ignite and burn the first gas generating agent 324, and a required amount (corresponding to the amount of the first gas generating agent 324) of high-temperature combustion gas is generated. At that time, the first gas generating chamber 320 is in communication with the inner space 303 in which the pressurized medium is charged and is maintained at a high pressure, therefore, the combustion of the first gas generating agent 324 is stable. The charge-transferring chamber 310, the first gas generating chamber 320 and the second gas generating chamber 330 are separated from each other by the cylindrical housing 311 and the second retainer 336, respectively, the second gas generating agent 334 is never ignited and burnt by the combustion of the first gas generating agent. The arrangement of the communication hole 325 of the first gas generating chamber 320 and the communication hole 335 of the second gas generating chamber 330 also functions to avoid igniting and burning the second gas generating agent 334 by the combustion of the first gas generating agent 324.

Thereafter, since the high temperature combustion gas flows from the communication hole 325 into the inflator housing 302 to increase the pressure therein, the pushed pressurized medium flows into the gas inflow space 350 through the ruptured principal rupturable disc 378. The pressurized medium which has flowed into the gas inflow space 350 in this manner is ejected from the diffuser port 382, after passing through the diffuser screen 386, to inflate the air bag mounted in the air bag module.

The second igniting initiator 340 is ignited by the activation signal-outputting means simultaneously with or slightly after the first igniting initiator 317 is activated (the staggered activating timings is the same as those of the embodiments 1 and 2), and the second rupturable disc 339 (fixed to the boss 345 forming the second communication hole 333) is ruptured so that the second gas generating agent 334 in the second gas generating chamber 330 is ignited and burnt, thereby generating the required amount of (an amount corresponding to the charged amount of the second gas generating agent 334) of a high temperature gas. At that time, the second gas generating chamber 330 is in communication with the inner space 303 in which the pressurized medium is charged and is maintained at high pressure, the combustion of the second gas generating agent 334 is stable.

The high-temperature combustion gas generated by the combustion of the second gas generating agent 334 flows into the inflator housing 302 from the communication hole 335 to increase the pressure in the inflator housing 302, and is ejected from the diffuser port 382 together with the remaining pressurized medium to further inflate the air bag.

By generating the combustion gas in two stages in this manner, a delayed start of an air bag's inflating action at the time of a vehicle collision can be prevented by the function of the first gas generating chamber 320, and the pressurized medium charged in the inflator housing 302 can be discharged completely by the function of the second gas generating chamber 330, thereby inflating the air bag immediately up to a satisfying safety level.

Since two gas generating chambers are provided, this hybrid inflator can also be adapted to a mode of embodiment such that a combustion gas is generated exclusively in the first gas generating chamber 320, a mode of embodiment such that a combustion gas is generated in the first and second gas generating chambers 320 and 330 simultaneously, and a mode of embodiment such that an interval between the times of generating respective combustion gases in the first gas generating chamber 320 and the second gas generating chamber 330 can be adjusted optionally.

(3) Embodiments 5, 6, and 7

Figure 5:
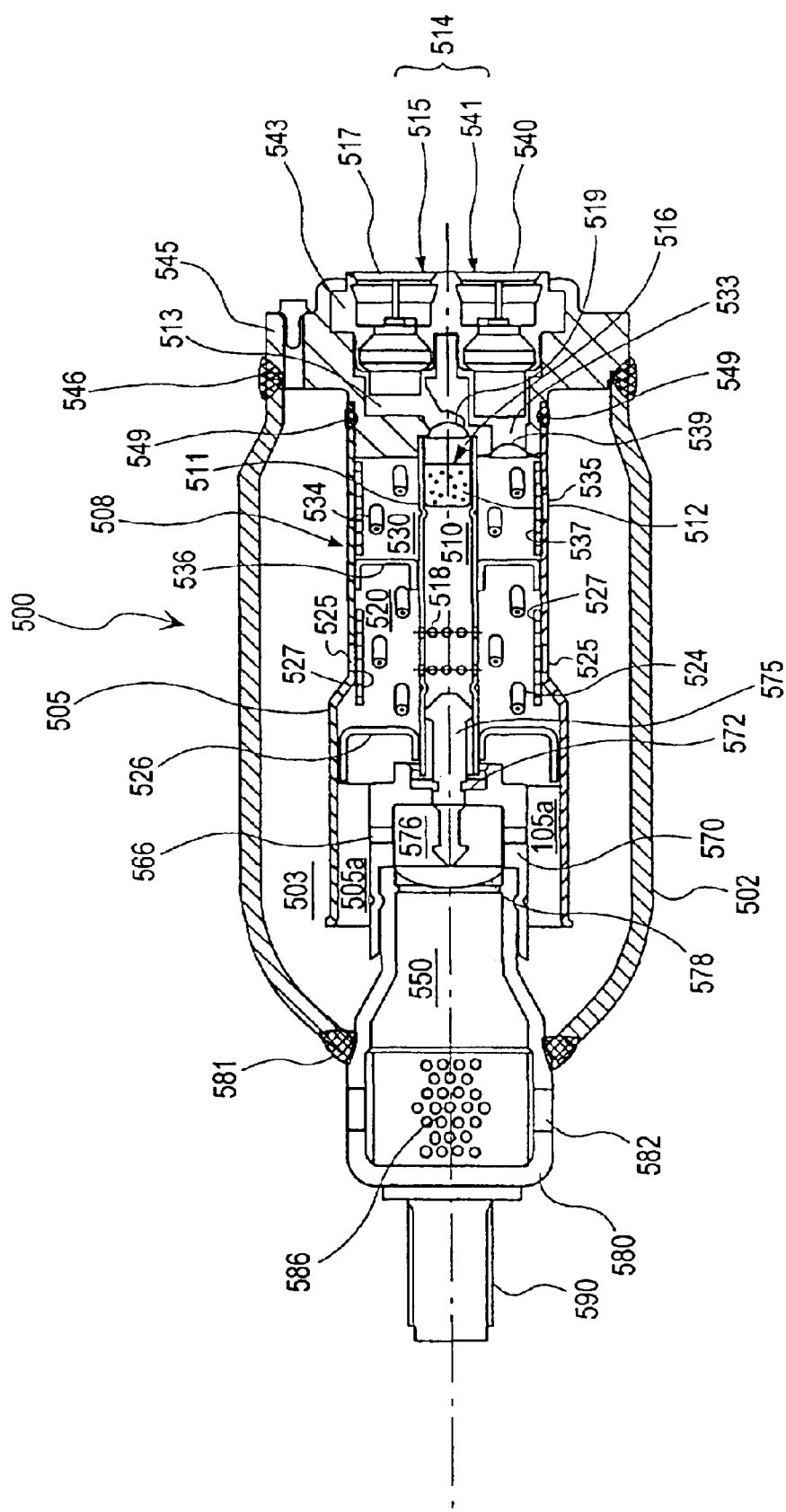
FIG. 5 is a cross-sectional view showing another embodiment of the hybrid inflator of the present invention.
Figure 6:
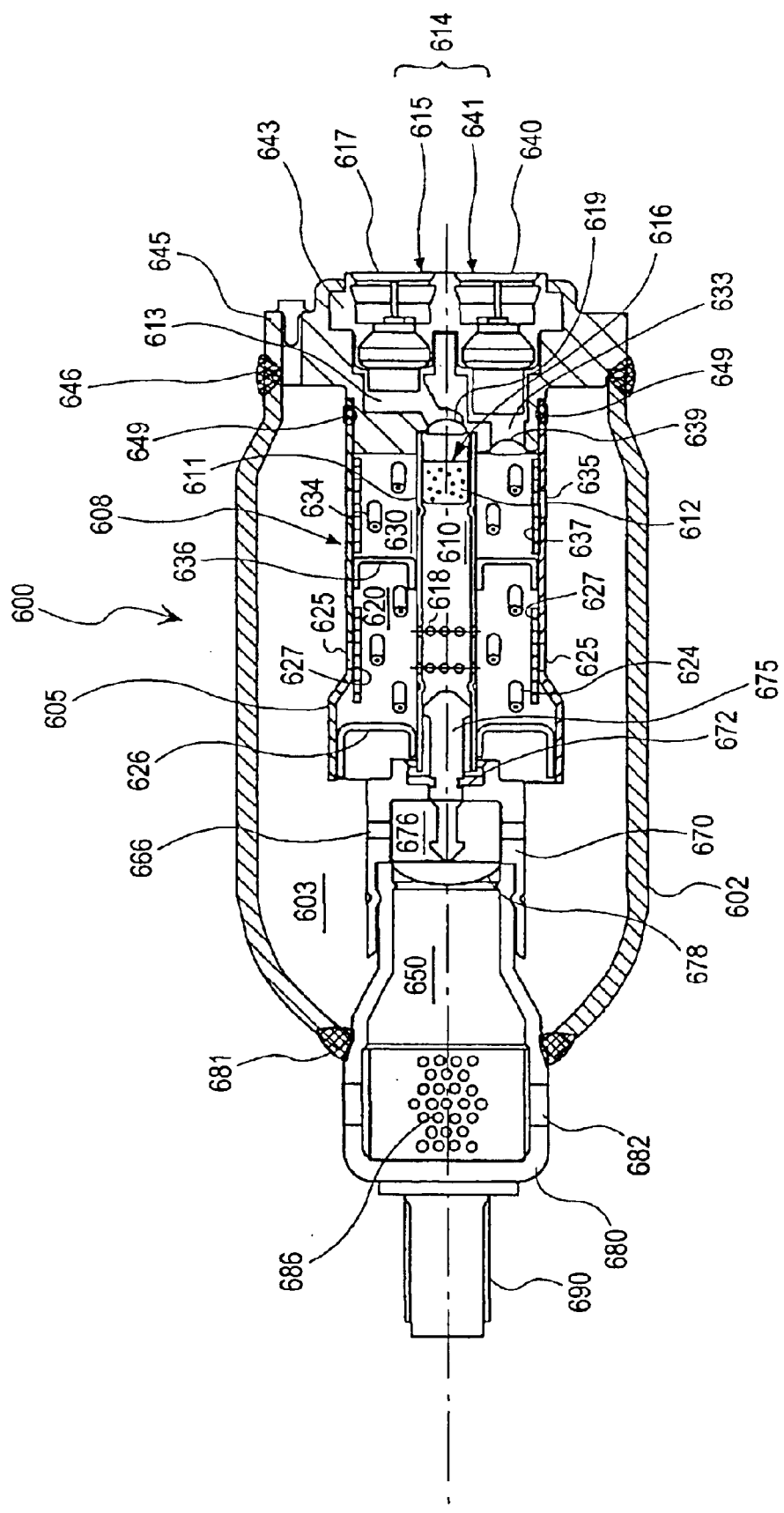
FIG. 6 is a cross-sectional view showing a modified embodiment of the hybrid inflator shown in FIG. 5.
Figure 7:
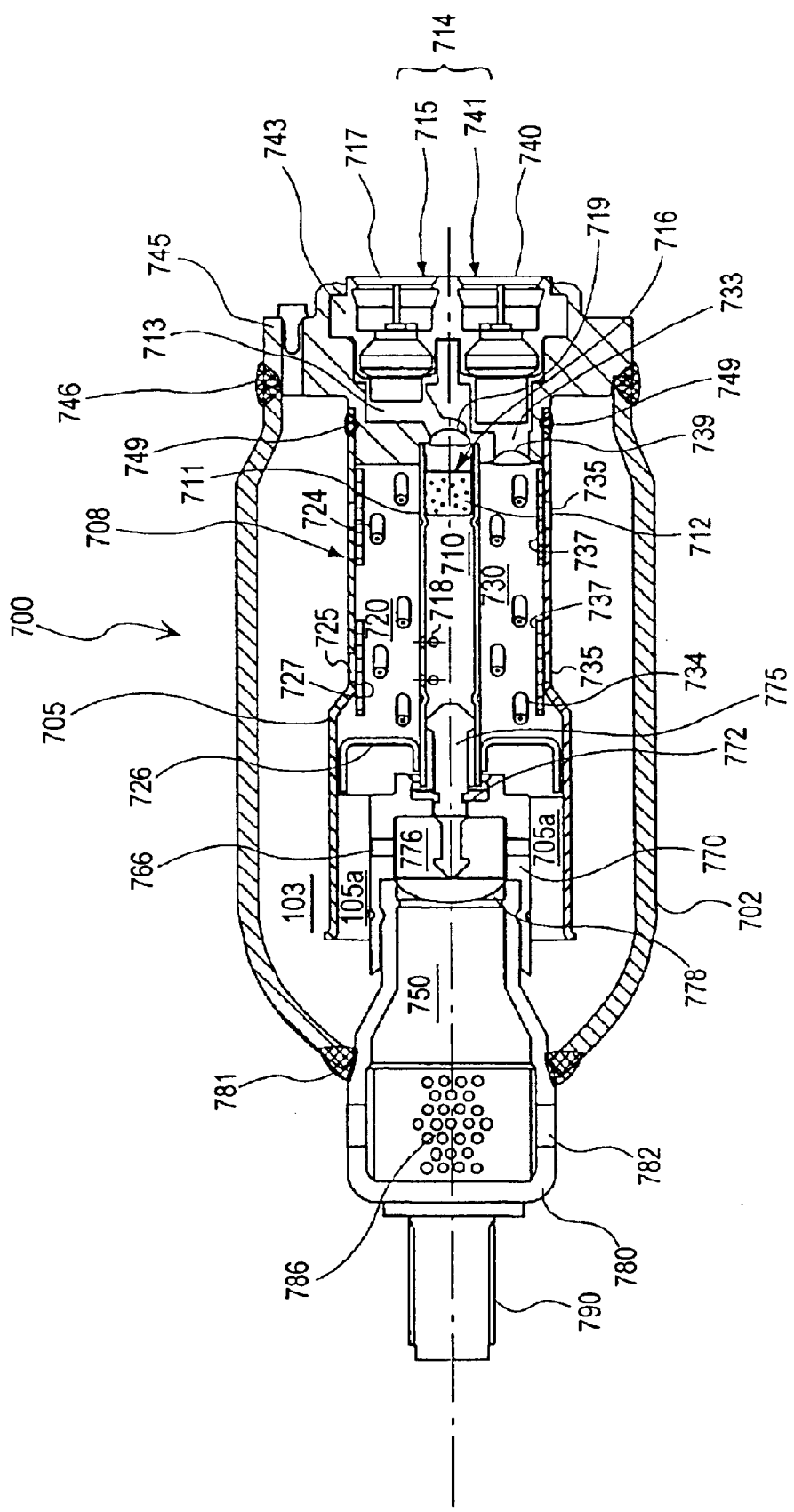
FIG. 7 is a cross-sectional view showing another embodiment of the hybrid inflator of the invention.

The present invention will be explained in detail with reference to the drawings showing other embodiments. FIG. 5 is a sectional view of a hybrid inflator 500 in the longitudinal direction thereof. FIG. 6 is a sectional view of a hybrid inflator 600 of a modification shown in FIG. 5 in the longitudinal direction thereof. FIG. 7 is a sectional view of another embodiment of a hybrid inflator 700 in the longitudinal direction thereof.

First, the hybrid inflator 500 shown in FIG. 5 will be explained. As shown in FIG. 5, an inflator housing 502 comprises a cylindrical pressure resisting container, and in an inner space 503 is filled with a pressurized medium and is maintained at a high pressure. The pressurized medium is usually charged from a small hole formed in a boss 545 connected to one end of the inflator housing 502, and the small hole is closed with a seal pin or the like after the pressurized medium has been charged.

A gas generator 508 includes a charge-transferring chamber 510, a first gas generating chamber 520 and a second gas generating chamber 530 both of which are arranged in series and adjacent to each other in the longitudinal direction of the inflator housing 502 such that they surround the charge-transferring chamber 510. The gas generator 508 is disposed in the inflator housing 502, and one end 549 of the gas generator 508 is fixed to the boss 545 by welding.

The charge-transferring chamber 510 comprises a cylindrical housing 511, and is connected to a first igniting initiator 517 through a booster cup 516 in which a booster (a transfer charge) 512 is charged and a first communication hole 513 closed by a first rupturable disc 519 of first closing means. The charge-transferring chamber 510 is in communication with a first gas generating chamber 520 through a communication hole 518.

The first gas generating chamber 520 is disposed around the charge-transferring chamber 510, and comprises a cylindrical housing 505, the housing 511 of the charge-transferring chamber 510, a first partition wall 526, and a second partition wall 536. A required amount of first gas generating agent 524 is accommodated as gas generating means in the first gas generating chamber 520. The first gas generating chamber 520 and the inflator housing 502 are in communication with each other through a communication hole 525 provided with a screen 527 therebetween.

The second gas generating chamber 530 comprises a cylindrical housing 505, a housing 511 of the charge-transferring chamber 510, a second partition wall 536, and the boss 545 (and a second rupturable disc 539). A required amount of second gas generating agent 534 is accommodated as gas generating means in the second gas generating chamber 530. The second gas generating chamber 530 and the inflator housing 502 are in communication with each other through a communication hole 535 provided with a screen 537 therebetween.

The amount of the second gas generating agent 534 may be set equal to, or larger or smaller than that of the first gas generating agent 524. Size, shape, and composition of the second gas generating agent may be the same as or different from those of the first gas generating agent 524. Additionally, volumes of the first gas generating chamber 520 and the second gas generating chamber 530 may be the same as or different from each other, and the volumes can be adjusted by the partition walls 526 and 536.

As described above, the charge-transferring chamber 510 is in communication with the first gas generating chamber 520, the first gas generating chamber 520 is in communication with the inflator housing 502, and the second gas generating chamber 530 is in communication with the inflator housing 502. Therefore, the interiors of the first and second gas generating chambers 520 and 530, and the charge-transferring chamber 510 are all maintained at a high pressure, i.e., at the same pressure as the interior (an inner space 503) of the inflator housing 502.

The first gas generating chamber 520 and the second gas generating chamber 530 are arranged in series and adjacent to each other in the longitudinal direction of the inflator housing 502. By arranging the chambers in series in this manner, even if the two gas generating chambers are provided, the overall size of the hybrid inflator can be made compact and the weight of the hybrid inflator can be minimized.

The first gas generating chamber 520 and the second gas generating chamber 530 are formed so as to have independent gas flowpaths, respectively, through which gases generated by combustion of the first gas generating agent 524 and the second gas generating agent 534 in the respective chambers 520 and 530 flow into the inflator housing 502. Namely, a gas generated in the first gas generating chamber 520 flows into the inflator housing 502 through the communication hole 525 via the screen 527, and a gas generated in the second gas generating chamber 530 flows into the inflator housing 502 from the communication hole 535 through the screen 537. The arrangement of the first and second gas generating chambers 520 and 530 may be in the reverse order.

The second gas generating chamber 530 is connected to the second igniting initiator 540 through the second communication hole 533 closed by the second rupturable disc 539 of the second closing means.

The igniting means chamber 514 formed in the boss 545 includes a first ignition chamber 515 and a second ignition chamber 541. The first ignition chamber 515 accommodates the first igniting initiator 517 therein, and the second ignition chamber 541 accommodates the second igniting initiator 540 therein. The first and second ignition chambers, 515 and 541 can be aligned in parallel and adjacent to each other in the lateral direction of the inflator housing 502.

The first igniting initiator 517 and the second igniting initiator 540 are mounted to the boss 545 through an initiator collar 543. The boss 545 is fixed to the inflator housing 502 at a connecting portion 546 by welding or the like.

Figure 12:
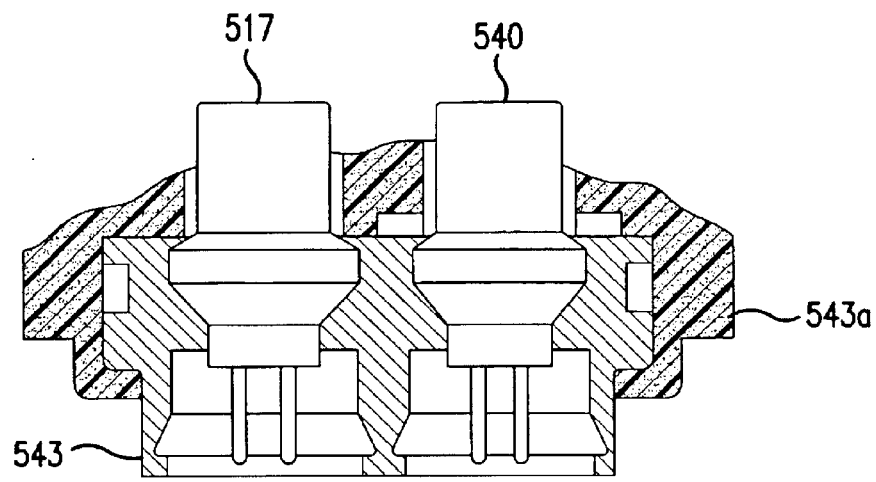
FIG. 12 is a sectional view of two initiators attached to an initiator collar by resin.

As a method of fixing the first and second igniting initiators 517 and 540 to the initiator collar 543 in order to form a single member, a method of fitting and fixing the initiators to the initiator collar 543, or a method of fixing the initiators to the initiator collar 543 using resin can be adopted. As illustrated in FIG. 12, fixing the initiators using resin can be proceeded in the following manner. The initiator collar 543 having a recess space therein is formed, the first and second igniting initiators 517 and 540 are inserted into the recess space and resin 543a is charged into the remaining recess space and cured, thereby integrally forming the initiator collar 543 and the first and second igniting initiators 517 and 540 as the single member. As the resin 543a, thermoplastic or thermosetting resin which is cured at a normal temperature or which is cured by heat can be used. A hardener or an accelerator may be mixed if required.

An adapter 570 is connected in extension of the charge-transferring chamber 510, and a projectile 575 in the illustrated shape is mounted to an open portion where the charge-transferring chamber 510 is connected to the adapter 570 through an O-ring 572, straddling the charge-transferring chamber 510 and the adapter 570, and the projectile 575 ruptures a principal rupturable disc 578 on actuation. A top end of the projectile 575 is positioned in an inner space 576 of the adapter 570. The inner space 576 and the inner space 503 of the inflator housing 502 are in communication with each other exclusively through a required numbers of gas inflow holes 566 formed on a surface of the adapter 570 which is opposite to an inner surface of the housing 505.

According to the embodiment shown in FIG. 5, since a gas channel 505a is formed with an inner surface of the housing 505 and an outer surface of the adapter 570, upon actuation, the pressurized medium in the inner space 503 flows into a gas inflow hole 566 necessarily through the gas channel 505a. On the other hand, according to the embodiment shown in FIG. 6, since the gas channel 505a shown in FIG. 5 is not provided, the pressurized medium in the inner space 603 flows directly into the gas inflow hole 666. Except for having no gas channel 105a, the structure of the hybrid inflator 600 shown in FIG. 6 is the same as that of the hybrid inflator 500 shown in FIG. 5.

The diffuser 580 is connected to the adapter 570, and the diffuser 580 is connected to the inflator housing 502 at the connecting portion 581 by welding.

The principal rupturable disc 578 of the principal closing means is mounted to an end of the diffuser 580 which is opposite to the projectile 575 in order to block a flowpath of the pressurized medium toward the diffuser port 582 before actuation. Therefore, a gas inflow space 550 and the inner space 576 of the adapter 570 are completely separated and isolated from each other by the principal rupturable disc 578 and thus, a flow of the pressurized medium is prevented before actuation.

A plurality of diffuser ports 582 for introducing the pressurized medium to the air bag and a diffuser screen 586 for removing fine particles are provided at the other end of the diffuser 580. A stud bolt 590 for connecting the diffuser 580 to the air bag module is fixed to the outer surface of the diffuser 580 by welding.

In the hybrid inflator 500, it is preferable that the above-described constituent elements are arranged symmetrically in the lateral direction with respect to the center axis (shown as a dotted line in FIG. 5), but some or all of the constituent elements may be arranged eccentrically with respect to the center axis.

In the hybrid inflator of the present invention, the arrangement of the first and second gas generating chambers 520 and 530 can be changed appropriately as described below.

For example, the first gas generating chamber 520 and the second gas generating chamber 530 can be arranged on both ends of the inflator housing 502, respectively, so as to face each other inside the housing. In this case, the pressurized medium is charged into the space between the first gas generating chamber 520 and the second gas generating chamber 530.

Further, for example, in the inflator housing 502, the first gas generating chamber 520 (or the second gas generating chamber 530) may be arranged to surround the charge-transferring chamber 510, and the second gas generating chamber 530 (or the first gas generating chamber 520) may be arranged to surround the first gas generating chamber 520.

An embodiment such that another arrangement of the first and second gas generating chambers is employed will be explained based on FIG. 7. The hybrid inflator 700 shown in FIG. 7 has the same structure as that of the inflator shown in FIG. 5, except for the arrangement of the first and second gas generating chambers. Therefore, a description other than the first gas generating chamber 720 and the second gas generating chamber 730 will be omitted.

The first gas generating chamber 720 and the second gas generating chamber 730 are arranged in the inflator housing 702 symmetrically in the lateral direction with respect to a charge-transferring chamber 710. Therefore, a cross section in the lateral direction of the first gas generating chamber 720 and the second gas generating chamber 730 is in a doughnut-like shape, and the charge-transferring chamber 710 is located at the portion which corresponds to a hole of the doughnut. The first gas generating chamber 720 and the second gas generating chamber 730 have shapes like a doughnut divided into two pieces of the same or different volumes. The communication hole 718 of the charge-transferring chamber 710 is in communication only with the first gas generating chamber 720. Therefore, when the first igniting initiator 717 is ignited, only the first gas generating agent 724 in the first gas generating chamber 720 is burnt.

The first gas generating chamber 720 and the inflator housing 702 (a space 703) are in communication with each other through the communication hole 725 provided with the screen 727 therebetween, and the second gas generating chamber 730 and the inflator housing 702 (the space 703) are in communication with each other through the communication hole 735 provided with the screen 737 therebetween. The communication hole 725 and 735 are formed to be opposite to each other in the lateral direction.

Next, the operation of the hybrid inflator 500 will be explained with reference to FIG. 5. Before the hybrid inflator 500 is activated, the pressurized medium charged in the inflator housing 502 under a high pressure has flowed into the first gas generating chamber 520 and the second gas generating chamber 530 which are in communication through the communication holes 525 and 535, respectively, and has also flowed into the charge-transferring chamber 510 through the communication hole 518, and the pressurized medium is maintained at the same high pressure. Further, the pressurized medium also flows into the inner space 576 of the adapter 570, and the space is maintained at the same pressure as the charge-transferring chamber 510 and thus, an erroneous activation of the projectile 575 is prevented.

When a vehicle collides, the first igniting initiator 517 is ignited by activation signal-outputting means to rupture the first rupturable disc 519 (fixed to the boss 545 forming the first communication hole 513), the booster 512 in the charge-transferring chamber 510 is ignited and burnt, thereby generating a high-temperature booster gas.

When the internal pressure in the charge-transferring chamber 510 is increased by the generated booster gas, the projectile 575 pushed by this pressure moves to rupture the principal rupturable disc 578 with the sharp top end of the projectile 575.

The booster gas flows into the first gas generating chamber 520 through the communication hole 518 to ignite and burn the first gas generating agent 524, and a required amount (corresponding to the amount of the stored first gas generating agent 524) of high temperature combustion gas is generated. At that time, the first gas generating chamber 520 at that time is in communication with the inner space 503 in which the pressurized medium is charged and is maintained at a high pressure, therefore, the combustion of the first gas generating agent 524 is stable. The charge-transferring chamber 510, the first gas generating chamber 520, and the second gas generating chamber 530 are separated from each other by the cylindrical housing 511 and the second retainer 536, respectively, the second gas generating agent 534 is never ignited and burnt by the combustion of the first gas generating agent. The arrangement of the communication hole 525 of the first gas generating chamber 520 and the communication hole 535 of the second gas generating chamber 530 also functions to avoid igniting and burning the second gas generating agent 534 by the combustion of the first gas generating agent 524.

Thereafter, since the high-temperature combustion gas flows through the communication hole 525 into the inflator housing 502 to increase the pressure of the inner space 503 of the housing 502, the pushed pressurized medium flows into the inner space 576 of the adapter through the gas inflow hole 566 and the gas channel 505a, and further flows into the gas inflow space 550 through the ruptured principal rupturable disc 578. Since the hybrid inflator 600 shown in FIG. 6 does not have any gas channel 505a, the pushed pressurized medium flows into the inner space 676 of the adapter directly through the gas inflow hole 666. The pressurized medium, which has flowed into the gas inflow space 650 in this manner, is ejected from the diffuser port 682 through the diffuser screen 687 to inflate the air bag mounted in the air bag module.

The second igniting initiator 540 is ignited by the activation signal-outputting means simultaneously with or slightly after the first igniting initiator 517 is activated, thereby rupturing the second rupturable disc 539 (fixed to the boss 545 forming the second communication hole 533) to ignite the second gas generating agent 534 in the second gas generating chamber 530, and a required amount (an amount corresponding to the stored amount of the second gas generating agent 534) of high-temperature combustion gas is generated. At that time, the second gas generating chamber 530 is in communication with the inner space 503 in which the pressurized medium is charged, and is maintained at a high pressure, therefore, the combustion of the second gas generating agent 534 is stable.

The high-temperature combustion gas generated by the combustion of the second gas generating agent 534 flows into the inflator housing 502 through the communication hole 535 to increase the pressure in the inflator housing 502, and is ejected through the diffuser port 582 together with the remaining pressurized medium to further inflate the air bag.

By generating the combustion gas in two stages in this manner, a delayed start of an air bag's inflating action at the time of a vehicle collision can be prevented by the function of the first gas generating chamber 520, and the pressurized medium of the inflator housing 502 can be discharged completely by the function of the second gas generating chamber 530, thereby being to able to inflate the air bag immediately up to a satisfying safety level.

Since two gas generating chambers are provided, this hybrid inflator can also be adapted to a mode of embodiment such that a combustion gas is generated exclusively in the first gas generating chamber 520, a mode of embodiment such that a combustion gas is generated in the first and second gas generating chambers 520 and 530 simultaneously, and a mode of embodiment such that an interval between the times of generating respective combustion gases in the first gas generating chamber 520 and the second gas generating chamber 530 can be adjusted optionally.

In the above embodiments 1 to 7, the hybrid inflator has two gas generating chambers in the gas generator. The present invention also includes a hybrid inflator having three or more gas generating chambers in the gas generator.

(4) Embodiments 8 to 12

Figure 8:
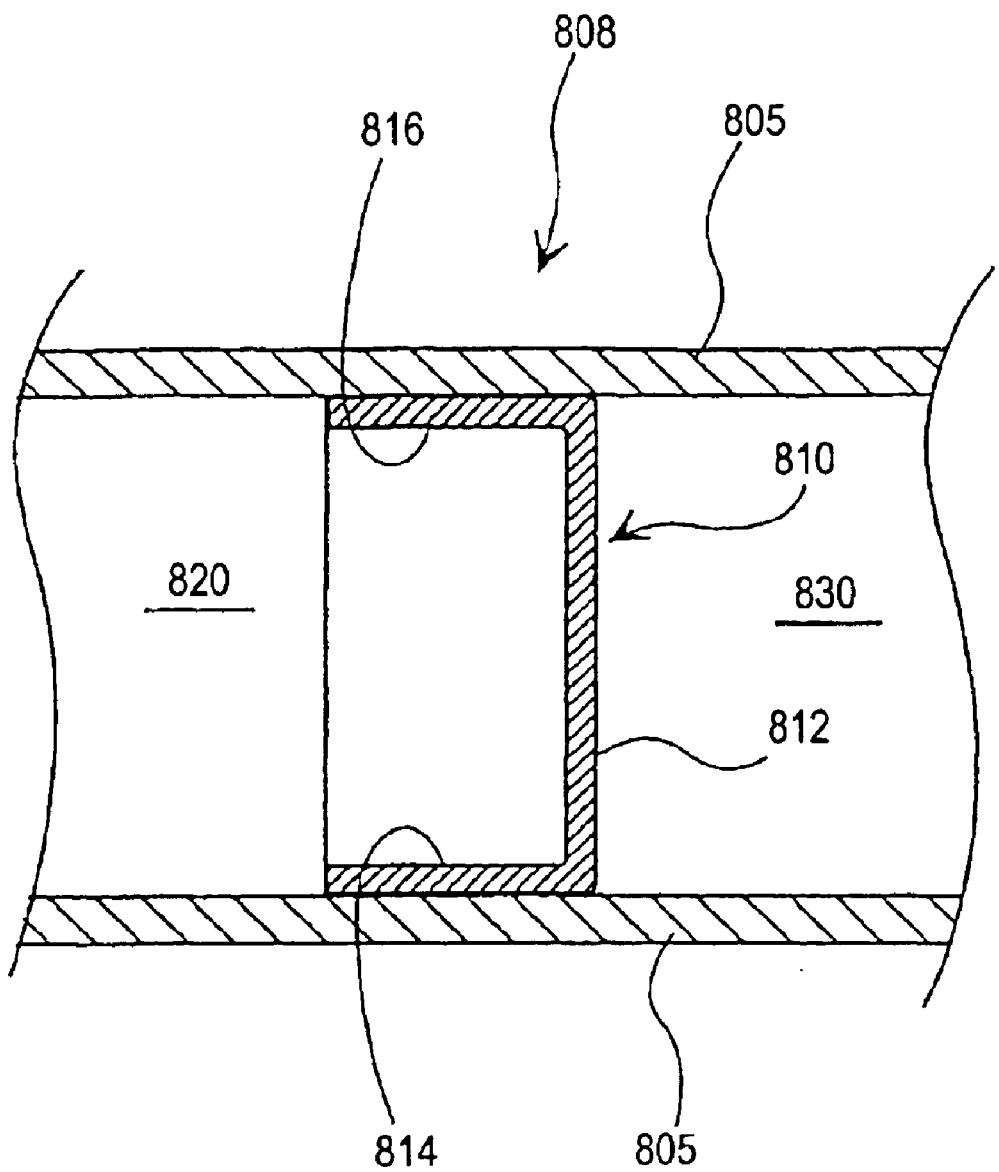
FIG. 8 is a schematic sectional view of a retainer for a gas generator and a gas generator along a longitudinal direction of the inflator.

First, an embodiment of the retainer for a gas generator based on FIG. 8 will be described. FIG. 8 is a schematic sectional view of a retainer for a gas generator and a gas generator in the longitudinal direction.

A retainer 810 for a gas generator 808 comprises a cylinder, having one end closed to form a closed end 812 and the other end open.

All side walls of the retainer 810 for a gas generator 808 may have a constant length or different length in part. For example, in FIG. 8, one side wall 814 may be longer or shorter than the other opposite side wall 816. The side walls are continuously formed together, and there is no clear boundary between the side walls 814 and 816 shown in FIG. 8. However, since the side walls are disposed in a gas generating chambers of the gas generator, it is preferable to divide the side walls into two, i.e., into the side wall 814 and the side wall 816.

In the gas generator 808, the retainer 810 for a gas generator 808 is disposed in a predetermined position within the gas generating chamber whose outer shell is made of a gas generator housing 805. An outer surface of the side wall of the retainer 810 is in contact with an inner side wall of the gas generator housing 805 (e.g., a gas generating chamber) so that a first gas generating chamber 812 and a second gas generating chamber 813 are separated from each other in the longitudinal direction by the closed end 812 in the flame-preventing state (at the same time, the retainer 810 functions to retain a gas generating agent and/or to adjust an amount of the gas generating agents). When the retainer 810 is disposed in order to retain the gas generating agent and/or to adjust the amount of the agent, the retainer 810 is disposed so that a volume of the gas generating chamber is obtained in accordance with consumption of the gas generating agent or the like.

Figure 9:
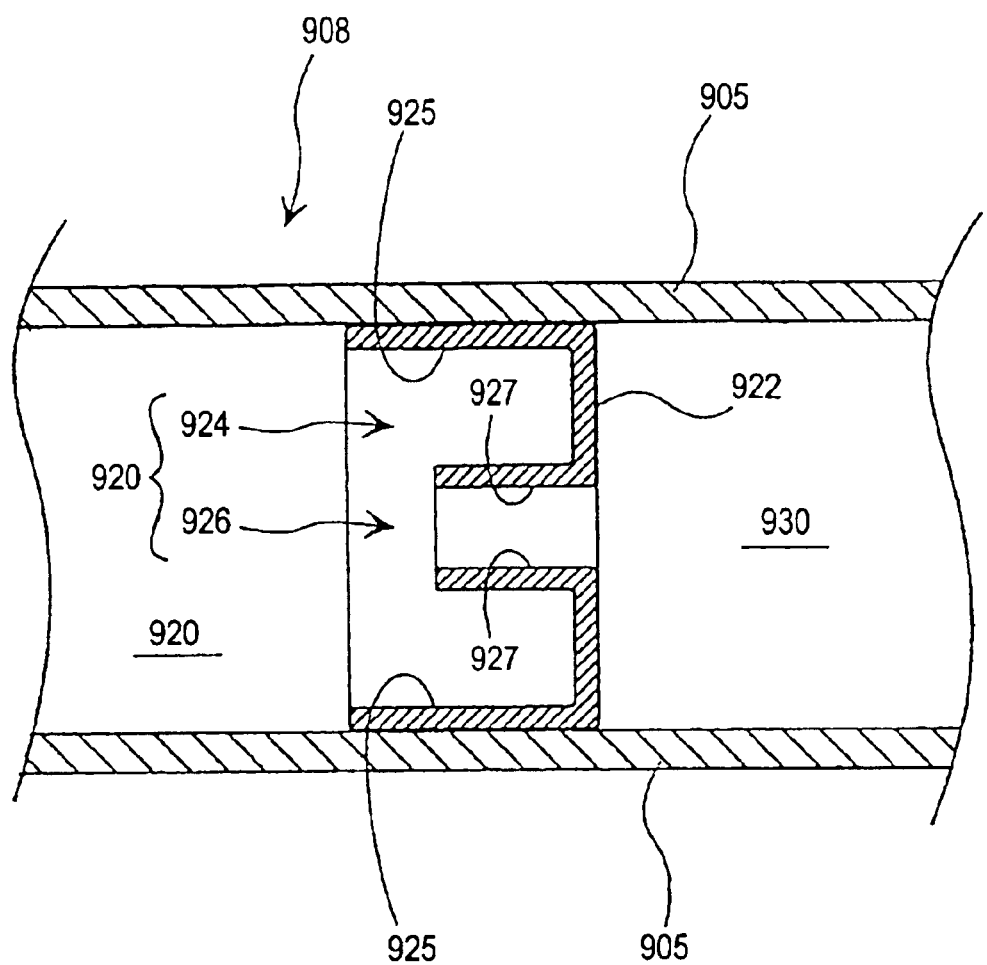
FIG. 9 is a schematic sectional view showing another embodiment of the retainer for a gas generator and the gas generator along a longitudinal direction of the inflator.
Figure 10:
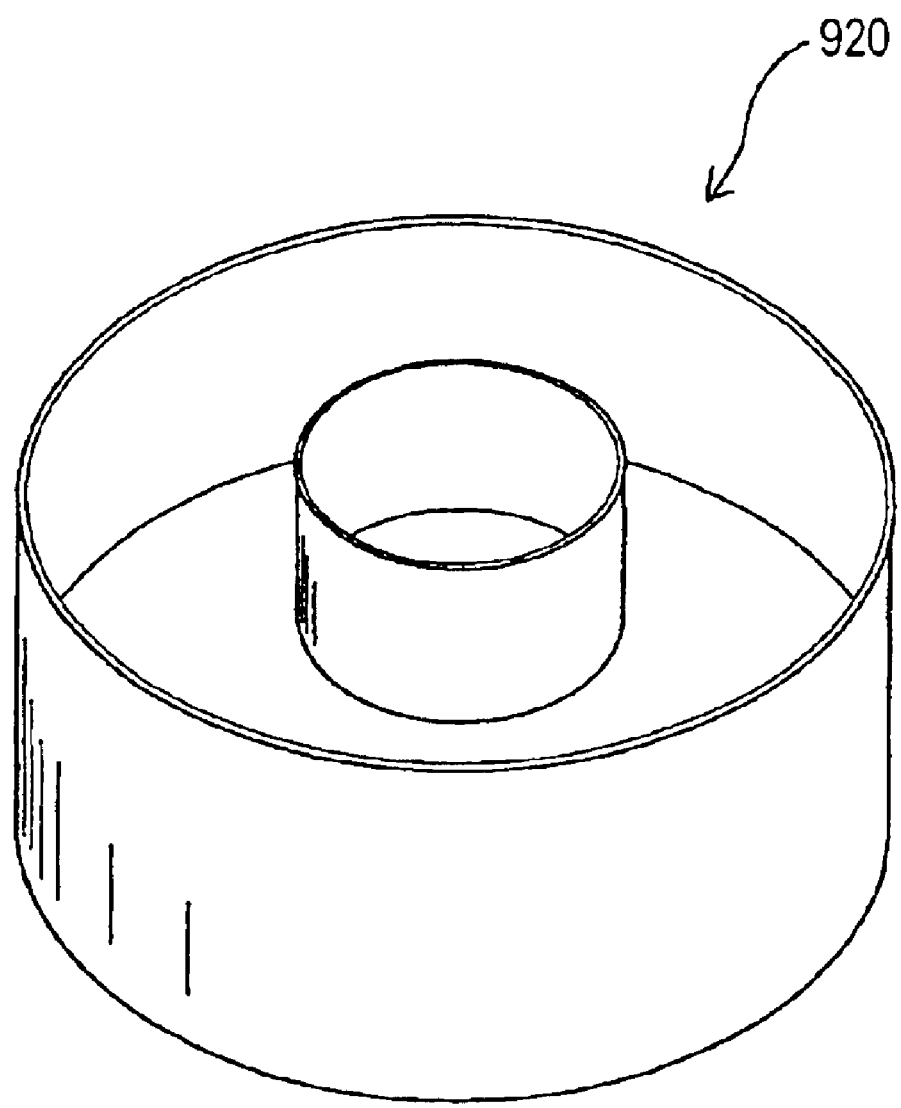
FIG. 10 is a perspective view the retainer for a gas generator shown in FIG. 9.

Next, another embodiment of the retainer for a gas generator will be explained based on FIGS. 9 and 10. FIG. 9 is a schematic sectional view in the longitudinal direction showing another embodiment of the retainer for a gas generator, and FIG. 10 is a perspective view of the retainer for a gas generator shown in FIG. 9.

A retainer 920 is a combination of a larger-diameter cylinder 924 having one end closed to form a closed end 922 and the other end open and a smaller-diameter cylinder 926 having both ends open, the smaller-diameter cylinder being integrated with the larger-diameter cylinder 924 to project toward the inside as well as the open end of the larger-diameter cylinder 924. The diameters of the larger-diameter cylinder 924 and the smaller-diameter cylinder 926 is not particularly limited.

In the retainer for a gas generator, a length of the side wall 925 of the larger-diameter cylinder 924 and a length of the side wall 927 of the smaller-diameter cylinder 926 can be the same as or different from each other. A length of the side wall 925 of the larger-diameter cylinder 924 can be longer or shorter than a length of the side wall 927 of the smaller-diameter cylinder 926.

In the gas generator 908, the retainer 920 for a gas generator is disposed in a predetermined position within the gas generating chamber whose outer shell is made of the gas generator housing 905. The retainer 920 is mounted by fitting the pierced open portion of the smaller-diameter cylinder 926 to a housing (not shown) of a charge-transferring chamber. In the larger-diameter cylinder 924 of the retainer 920, an outer surface of the side wall 925 is in contact with an inner side wall of the gas generator housing 905 (i.e., the gas generating chamber). In the smaller-diameter cylinder 926, an inner surface of the side wall 927 is in contact with an outer wall of the charge-transferring chamber. Accordingly, two gas generating chambers 920 and 930 are separated in the longitudinal direction by the closed end 922 in the flame-preventing state (at the same time, the retainer 920 also functions to retain the gas generating agent and/or to adjust an amount of the gas generating agents). When the retainer 920 is disposed in order to retain the gas generating agent and/or to adjust an amount of the gas generating agents, the retainer 920 is disposed so that a volume of the gas generating chamber can be obtained in accordance with consumption of the gas generating agent or the like.

Next, a hybrid inflator in which the retainer for a gas generator shown in FIGS. 9 and 10 is disposed in the gas generator will be explained based on FIGS. 11, 5, and 3. Each of FIGS. 11, 5, and 3 is a sectional view of the hybrid inflator in the longitudinal direction thereof.

Figure 11:
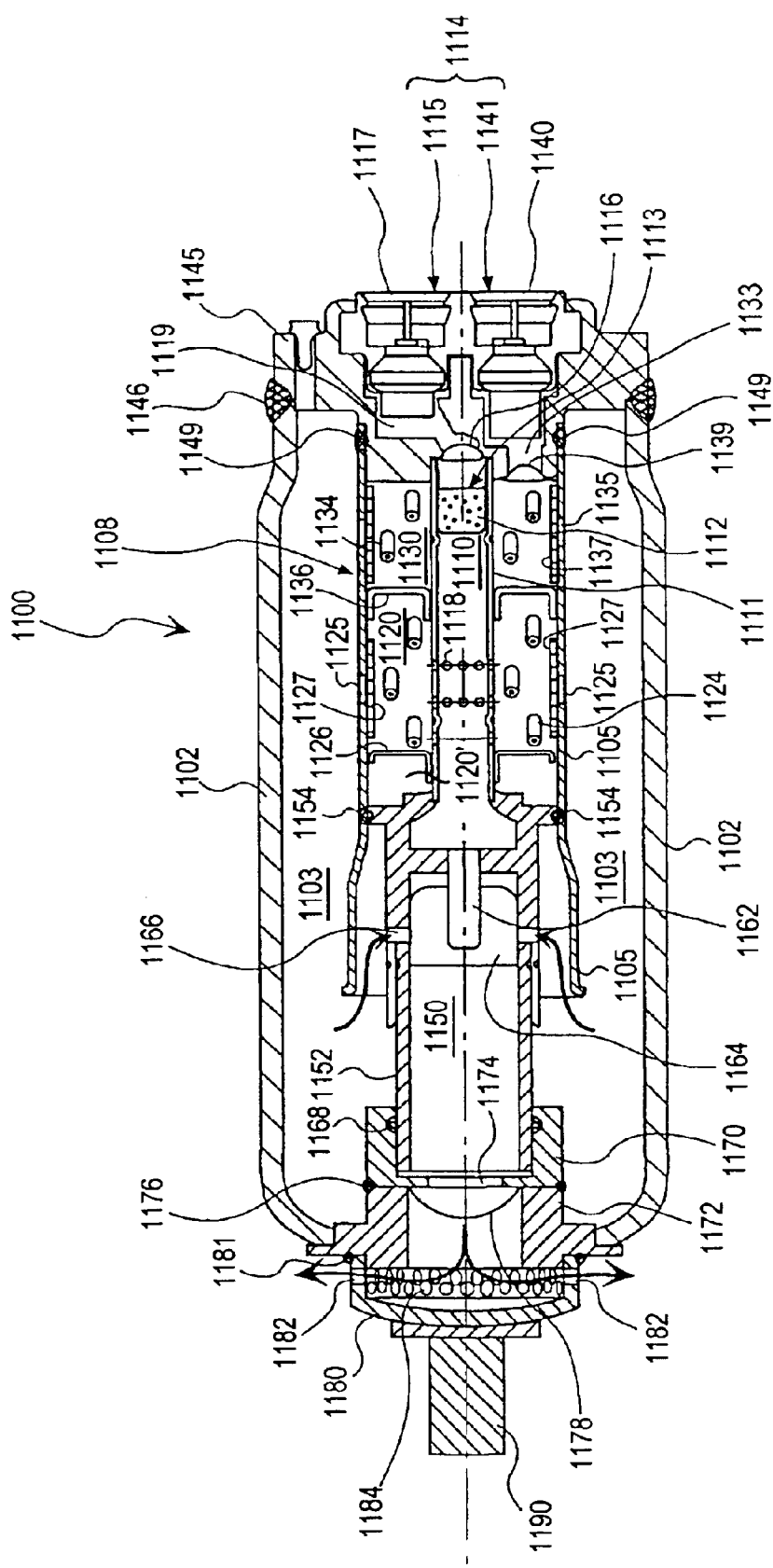
FIG. 11 is a sectional view of a hybrid inflator using the retainer for a gas generator shown in FIG. 9 in the longitudinal direction of the inflator.

(1) Hybrid Inflator of an Embodiment Shown in FIG. 11

As the retainer 920 for a gas generator shown in FIGS. 9 and 10, a first retainer (a first partition wall) 1126 whose side wall 927 of the smaller-diameter cylinder 926 is longer than the side wall 925 of the larger-diameter cylinder 924, and a second retainer (a second partition wall) 1136 whose side wall 927 of the smaller-diameter cylinder 926 and side wall 925 of the larger-diameter cylinder 924 have a constant length are used.

An inflator housing 1102 comprises a cylindrical pressure resisting container, and in inner space 1103 is filled with a pressurized medium and maintained at a high pressure. The pressurized medium is usually charged from a small hole formed in a boss 1145 connected to one end of the inflator housing 1102, and the small hole is closed with a seal pin or the like after the pressurized medium has been charged.

A gas generator 1108 includes a charge-transferring chamber 1110, a first gas generating chamber 1120 and a second gas generating chamber 1130 both of which are arranged in series and adjacent to each other in the longitudinal direction of the inflator housing 1102 to surround the charge-transferring chamber 1110, and an afterburner 1150 disposed in extension of the charge-transferring chamber 1110.

The gas generator 1108 is disposed in the inflator housing 1102, and connected and fixed to the inflator housing 1102 through the boss 1145 and an adapter 1170 (boss 1172) at the opposite ends in the longitudinal direction of the inflator housing 1102.

The charge-transferring chamber 1110 comprises a cylindrical housing 1111, and is connected to a first igniting initiator 1117 through a booster cup 1113 in which a booster (a transfer charge) 1112 is charged and a first communication hole 1119 closed by a first rupturable disc 1116 of first closing means. The charge-transferring chamber 1110 is in communication with the first gas generating chamber 1120 through a communication hole 1118.

The first gas generating chamber 1120 is disposed around the charge-transferring chamber 1110, and comprises a cylindrical gas generator housing 1105, the housing 1111 of the charge-transferring chamber 1110, the first retainer (the first partition wall) 1126, and the second retainer (the second partition wall) 1136. A required amount of first gas generating agent 1124 is accommodated as gas generating means in the first gas generating chamber 1120. The first gas generating chamber 1120 and the inflator housing 1102 are in communication with each other through a communication hole 1125 provided with a screen 1127 therebetween.

The first retainer 1126 and the second retainer 1136 are mounted by being fitted into the cylindrical housing 1111 at a pierced open portion of the smaller-diameter cylinder 926.

The first retainer 1126 is disposed in a state such that the shorter side wall 925 of the larger-diameter cylinder 924 is in contact with the inner side wall of the gas generator housing 1105, and the longer side wall 927 of the smaller-diameter cylinder 926 is in contact with the outer side wall of the housing 1111. This first retainer 1126 is used for adjusting an amount of the gas generating agents (a first gas generating agent 1124), in other words, for adjusting the volume of the first gas generating chamber 1120, and the first retainer 1126 is disposed so that an appropriate volume in accordance with the amount of the first gas generating agent 1124 can be obtained.

The second retainer 1136 is disposed in a state such that the side wall 925 of the larger-diameter cylinder 924 is in contact with the inner side wall of the gas generator housing 1105, and the side wall 927 (having the same length of the side wall 925 of the larger-diameter cylinder 924) of the smaller-diameter cylinder 926 is in contact with the outer side wall of the cylindrical housing 1111. The first gas generating chamber 1120 and the second gas generating chamber 1130 are separated from each other in the flame-preventing state by the second retainer 1136. At the same time, the second retainer 1136 also functions to retain the second gas generating agent 1134 and/or to adjust an amount of the gas generating agents.

The second gas generating chamber 1130 comprises a cylindrical housing 1105, the housing 1111 of the charge-transferring chamber 1110, the second retainer 1136, and the boss 1145 (and second rupturable disc 1139). A required amount of second gas generating agent 1134 is accommodated as the gas generating means in the second gas generating chamber 1130. The second gas generating chamber 1130 and the inflator housing 1102 are in communication with each other through the hole 1135, inserting a screen 1137 therebetween. The amount of the second gas generating agent 1134 may be set equal to, or larger or smaller than that of the first gas generating agent 1124.

As described above, the charge-transferring chamber 1110 is in communication with the first gas generating chamber 1120, the first gas generating chamber 1120 is in communication with the inflator housing 1102, and the second gas generating chamber 1130 is in communication with the inflator housing 1102. Accordingly, the interiors of the first and second gas generating chambers 1120 and 1130 and the charge-transferring chamber 1110 are all maintained at a high pressure, i.e., at the same pressure as the interior (the inner space 1103) of the inflator housing 1102.

The first gas generating chamber 1120 and the second gas generating chamber 1130 are arranged in series and adjacent to each other in the longitudinal direction of the inflator housing 1102. By arranging the chambers this manner, even if the two gas generating chambers are provided, the overall size of the hybrid inflator can be made compact and the weight of the hybrid inflator can be minimized.

Preferably, the first gas generating chamber 1120 and the second gas generating chamber 1130 are arranged in such an order that the first gas generating chamber 1120 is provided closer to the gas outlet 1174 than the second gas generating chamber 1130, and, therefore, combustion in the first gas generating chamber 1120 does not have any effect on the second gas generating agent 1134. However, these chambers may be arranged in the reverse order.

The second gas generating chamber 1130 is connected to the second igniting initiator 1140 through the second communication hole 1133 closed by the second rupturable disc 1139 of the second closing means.

Further, the first gas generating chamber 1120 and the second gas generating chamber 1130 are formed so as to have independent gas flowpaths, respectively, through which gases generated by combustion of the first gas generating agent 1124 and the second gas generating agent 1134 in the respective chambers 1120 and 1130 flow into the inflator housing 1102. Namely, a gas generated in the first gas generating chamber 1120 flows into the inflator housing 1102 through the communication hole 1125 via the screen 1127, and a gas generated in the second gas generating chamber 1130 flows into the inflator housing 1102 through the communication hole 1135 via the screen 1137.

The igniting means chamber 1114 formed in the boss 1145 includes a first ignition chamber 1115 and a second ignition chamber 1141. The first ignition chamber 1115 accommodates the first igniting initiator 1117 therein, and the second ignition chamber 1141 accommodates the second igniting initiator 1140 therein. The first and second ignition chambers can be aligned in parallel and adjacent to each other in the lateral direction of the inflator housing 1102.

The first igniting initiator 1117 and the second igniting initiator 1140 are mounted to the boss 1145. The boss 1145 is fixed to the inflator housing 1102 at a connecting portion 1146 by welding or the like.

The boss 1145 and the housing 1105 are fixed to each other at a connecting portion 1149 by welding or the like.

The afterburner 1150 is made of a housing 1152, and disposed in the direction of the gas outlet 1174 in extension of the charge-transferring chamber 110. One end of the afterburner 1150 is fixed to the housing 1105 at a connecting portion 1154 by welding or the like.

An afterburner nozzle (or an aspirator) 1162 is mounted to one end of the afterburner 1150. The afterburner 1150 and the inflator housing 1102 are in communication with each other through a hole 1166. A valve 1164 is disposed in a position to contact the hole 1166 inside the afterburner 1150.

The valve 1164 has a peripheral portion fixed to an inner side wall of the housing 1152 for example in a cantilever connection and a other portion, not fixed to the inner side wall, which can be deformed due to pressure from inside and outside (by a difference between an internal pressure and an external pressure). It is possible to use, as the valve 1164, fitting metal material which is made of a substantially cylindrical roll and can be deformed by pressure (e.g., 300 series stainless steel having a thickness of about 0.0508 mm).

The other end (on the gas outlet 1174 side) of the afterburner 1150 is connected to the adapter 1170 through an O-ring 1168, and the adapter 1170 is fixed to a boss 1172 at a connecting portion 1176 by welding or the like. Further, a principal rupturable disc 1178 is fixed at its periphery to the connecting portion 1176 by welding or the like so as to close the gas outlet 1174.

A diffuser 1180 is fixed to the boss 1172 at a connecting portion 1181 by welding or the like. The diffuser 1180 includes a plurality of diffuser ports 1182 for introducing the pressurized medium to the air bag and a diffuser screen 1184 for removing fine particle. The outer surface of the diffuser 1180 is provided with a stud bolt 1190 for connecting the diffuser 1180 to the air bag module to each other.

In the hybrid inflator 1100, it is preferable that the above-described constituent elements are arranged symmetrically in the lateral direction with respect to the center axis (shown as a dotted line in FIG. 11), but some or all of the constituent elements may be arranged eccentrically with respect to the center axis.

(2) Hybrid Inflator of the Embodiment Shown in FIG. 5

In the hybrid inflator 500 shown in FIG. 5, the side wall of the larger-diameter cylinder 924 of the first retainer 526 is longer than the side wall of the smaller-diameter cylinder 926 unlike the hybrid inflator shown in FIG. 11.

The first retainer 526 and the second retainer 536 are mounted by fitting the pierced open end of the smaller-diameter cylinder 926 to the cylindrical housing 511.

The first retainer 526 is disposed in a state such that the longer side wall 925 of the larger-diameter cylinder 924 is in contact with the inner side wall of the gas generator housing 505, and the shorter side wall 927 of the smaller-diameter cylinder 926 is in contact with the outer side wall of the cylindrical housing 511. The first retainer 526 is used for adjusting an amount of the gas generating agents (the first gas generating agent 524), i.e., for adjusting the volume of the first gas generating chamber 520, and the first retainer 526 is disposed so that an appropriate volume in accordance with the amount of the first gas generating agent 524 can be obtained.

The second retainer 536 is disposed in a state such that the side wall 925 of the larger-diameter cylinder 924 is in contact with the inner side wall of the gas generator housing 505, and the side wall 927 (having the same length of the side wall 925 of the larger-diameter cylinder 924) of the smaller-diameter cylinder 926 is in contact with the outer side wall of the cylindrical housing 511. The first gas generating chamber 520 and the second gas generating chamber 530 are separated from each other in the flame-preventing state by means of the second retainer 536. At the same time, the second retainer 536 functions to retain the second gas generating agent 534 and/or to adjust an amount of the gas generating agent.

The rupturing mechanism of the principal rupturable disc 578 of the embodiment shown in FIG. 5 is as explained in embodiment 5.

(3) Hybrid Inflator of the Embodiment Shown in FIG. 3

In the hybrid inflator 300 shown in FIG. 3, in the first and second retainers 326 and 336, the side wall 925 of the larger-diameter cylinder 924 is longer than the side wall 927 of the smaller-diameter cylinder 926.

The first retainer 326 and the second retainer 336 are mounted by fitting the pierced open end to the cylindrical housing 311.

The first retainer 326 is disposed in a state such that the long side wall 925 of the larger-diameter cylinder 924 is in contact with the inner side wall of the gas generator housing 305, and the short side wall 927 of the smaller-diameter cylinder 926 is in contact with the outer side wall of the housing 311. The first retainer 326 is used for adjusting an amount of the gas generating agents (the first gas generating agent 324), i.e., for adjusting the volume of the first gas generating chamber 320, and the first retainer 326 is disposed so that an appropriate volume in accordance with the amount of the first gas generating agent 324 can be obtained.

The second retainer 336 is disposed in a state so that the side wall 925 of the larger-diameter cylinder 924 is in contact with the inner side wall of the gas generator housing 305, and the side wall 927 of the smaller-diameter cylinder 926 is in contact with the outer side wall of the housing 311. The first gas generating chamber 320 and the second gas generating chamber 330 are separated from each other in the flame-preventing state by the second retainer 336. At the same time, the second retainer 336 functions to retain the second gas generating agent 334 and/or to adjust an amount of the gas generating agents.

The rupturing mechanism of the principal rupturable disc 378 of the embodiment shown in FIG. 3 is as explained in the embodiment 3.

Next, the operation of the retainers 1126, 1136, 526, 536, 326, and 336 in the hybrid inflator 1100, 500, and 300 shown in FIGS. 11, 5, and 3 will be explained.

As shown in FIGS. 11, 5 and 3, the first retainer 1126, 526, and 326 and the second retainer 1136, 536, and 336 are arranged so that the open ends thereof are directed in the same direction. The open end of the second retainer 1136, 536, and 336 is arranged so as to face the first gas generating chamber 1120, 520 and 320. With this arrangement, the first igniting initiator 1117, 517, and 317 is activated to ignite the transfer charge 1112, 512, and 312, and the first gas generating agent 1124, 524, and 324 is ignited and burnt to increase the pressure in the first gas generating chamber 1120, 520, and 320, and then, the second retainer 1136, 536, and 336 is deformed so as to push and widen the open end thereof, i.e., the side wall 925 of the larger-diameter cylinder 924 presses the gas generator housing 1105, 505, and 305 and the side wall 927 of the smaller-diameter cylinder 926 presses the cylindrical housing 1111, 511, and 311. Accordingly, the first gas generating chamber 1120, 520, and 320 and the second gas generating chamber 1130, 530, and 330 are separated from each other in the flame-preventing state. Thus, combustion of the second gas generating agent due to combustion of the first gas generating agent 1124, 524, and 324 is prevented, and the erroneous actuation of the hybrid inflator 1100, 500, and 300 is prevented.

When the second gas generating agent 1134, 534, and 334 is burnt in the second gas generating chamber 1130, 530, and 330 consequently after combustion of the first gas generating agent 1124, 524, and 324 in the first gas generating chamber 1120, 520, and 320, a high-temperature combustion gas flows out from the communication hole 1135, 535, and 335. At that time, even if a small amount of combustion gas flowed out into the first gas generating chamber 1120, 520, and 320 through a gap between the second retainer 1136, 536, and 336 and the gas generator housing 1105, 505, and 305 or a gap between the second retainer 1136, 536, and 336 and the cylindrical housing 1111, 511, and 311, this does not spoil the function of the hybrid inflator 1100, 500, and 300.

By increase of the pressure due to flowing the high-temperature combustion gas in this manner, in the case of the embodiment shown in FIG. 11, the valve 1164 is deformed by the pushed pressurized medium and the path for the pressurized medium is ensured to rupture the principal rupturable disc 1178, and in the case of the embodiments shown in FIGS. 5 and 3, the principal rupturable disc 578 and 378 is ruptured by the projectile 575 and 375 to discharge the pressurized medium from the diffuser port 582 and 382. Then, the connected air bag is inflated instantly.

(4) Embodiment of Air Bag System

Figure 13:
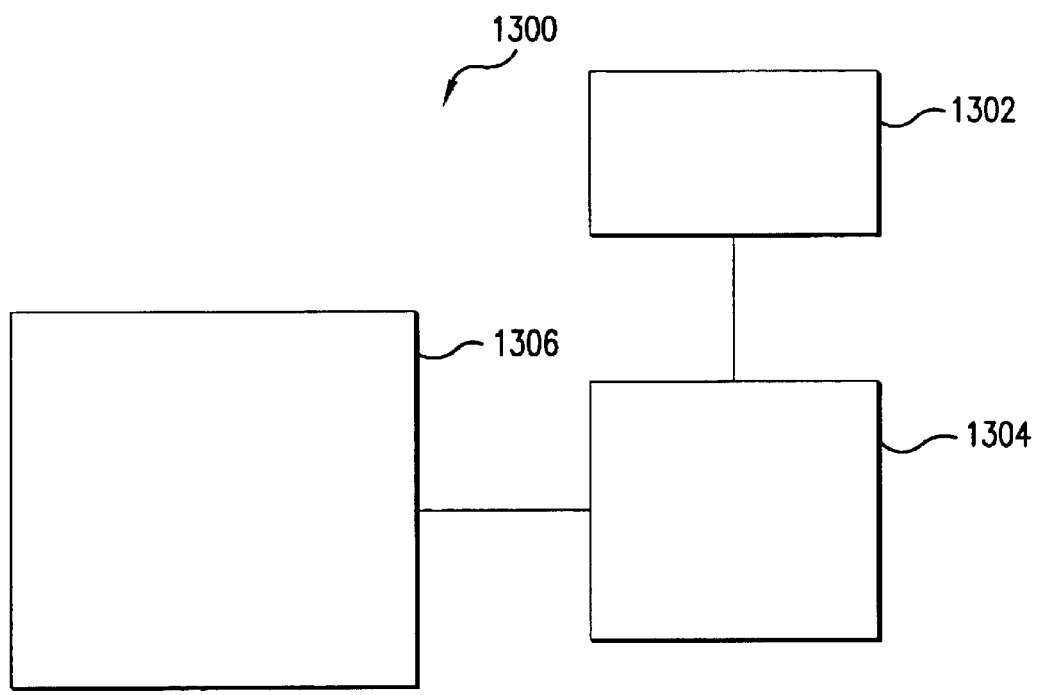
FIG. 13 is a block diagram of an air bag system.

As shown in FIG. 13, the air bag system 1300 of the present invention comprises activation signal-outputting means including an impact sensor 1302 and a control unit 1304, and a module case 1306 in which the hybrid inflator and the air bag are accommodated. In the hybrid inflator 100-, 200, 300, 400, 500, 600, 700, and 1100 shown in FIGS. 1 to 7 and 11, the activation signal-outputting means (the impact sensor and the control unit) is connected to the first igniting initiator 117, 217, 317, 417, 517, 617, 717, and 1117 and the second igniting initiator 140, 240, 340, 440, 540, 640, 740 and 1140, and a stud bolt 190, 290, 390, 490, 590, 690, 790, and 1190 is connected and fixed by screwing into the module case in which the air bag is mounted. In the air bag system of such a structure, the gas generating amount is adjusted in accordance with the magnitude of the impact by appropriately setting the activation-signal outputting condition of the activation signal-outputting means, thereby making it possible to adjust the inflating speed of the air bag.

For example, when the vehicle undergoes a small impact, the activation signal is outputted only to the first igniting initiator 117, 217, 317, 417, 517, 617, 717, and 1117 of the hybrid inflator 100, 200, 300, 400, 500, 600, 700, and 1100 to ignite, the gas generating amount from the gas generator 108, 208, 308, 408, 508, 608, 708, and 1108 is suppressed, thereby making the inflating speed of the air bag slow (or moderating the inflating pressure). By adjusting the gas generating amount in accordance with the magnitude of the impact in this manner, the air bag is prevented from inflating and developing abruptly to apply a strong force more than necessary to the passenger in the case of a small impact.

When the vehicle undergoes a large impact, the activation signals are outputted to the first igniting initiator 117, 217, 317, 417, 517, 617, 717, and 1117 and the second igniting initiator 140, 240, 340, 440, 540, 640, 740, and 1140 at the same time to ignite, the combustion gas generating amount from the gas generator 108, 208, 308, 408, 508, 608, 708, and 1108 is maximized to increase the inflating speed of the air bag.

Further, when the vehicle undergoes a medium impact, a time lag is provided between the igniting timings of the first igniting initiator 117, 217, 317, 417, 517, 617, 717, and 1117 and the second igniting initiator 140, 240, 340, 440, 540, 640, 740, and 1140 of the hybrid inflator, thereby adjusting the inflating speed to a value in accordance with the passenger's condition. That is, the inflating speed of the air bag is made slow immediately after the vehicle has undergone an impact and thereafter, the inflating speed is increased to inflate and develop the air bag to form a cushion in front of the passenger. It is also possible to control the activation signal to the ignitions, 117, 217, 317, 417, 517, 617, 717, and 1117 and 140, 240, 340, 440, 540, 640, 740, and 1140 to adjust the inflating speed of the air bag in accordance with physique, weight, and/or position of the passenger in addition to the magnitude of the impact applied to the vehicle.

What is claimed is:

1. A multistage-inflating hybrid inflator for a safety system of a vehicle provided with an air bag, comprising:
    an inflator housing, an interior thereof being filled with a pressurized medium containing inert gas;
    an ignition means chamber connected to a gas generator; and
    said gas generator provided in said inflator housing and having a first gas generating chamber and a second gas generating chamber for storing gas generating means, and a single common transferring tube penetrating through the first gas generating chamber and the second gas generating chamber, the transferring tube providing heat to ignite the gas generating means provided inside the first gas generating chamber.

2. A multistage-inflating hybrid inflator for a safety system of a vehicle provided with an air bag, comprising:
    an inflator housing, an interior thereof being filled with a pressurized medium containing inert gas, the inflator further having principal closing means to close, before actuation, transition of the pressurized medium outward to discharging ports and a projectile for rupturing the principal closing means on actuation;
    a gas generator accommodated in the inflator housing and having a first gas generating chamber and a second gas generating chamber, each containing gas generating means therein;
    an ignition means chamber connected to the gas generator; and
    a transfer charge provided independently from the gas generating means, said transfer charge being ignited by said ignition means to drive the projectile to rupture the principal closing means.

3. A multistage-inflating hybrid inflator as claimed in claim 2, wherein a tip of the projectile is disposed in a space where the pressurized medium is charged.

4. A multistage-inflating hybrid inflator as claimed in claim 2, wherein a tip of the projectile is disposed in a space defined by an element other than said inflator housing.

5. A multistage-inflating hybrid inflator as claimed in any one of claims 1 and 2 to 4, wherein said first gas generating chamber communicates with said inflator housing and said second gas generating chamber also communicates with said inflator housing.

6. A multistage-inflating hybrid inflator as claimed in any one of claims 2 to 4, wherein said first and second gas generating chambers are arranged in series and adjacently to each other in a longitudinal direction of said inflator housing.

7. The multistage-inflating hybrid inflator as claimed in any one of claims 2 to 4, wherein the first and second gas generating chambers are aligned in parallel to each other in a lateral direction of the housing and are adjacent to or separated from each other.

8. A multistage-inflating hybrid inflator as claimed in any one of claims 1 and 2 to 4, wherein flowpaths which directs gases generated in said first and second gas generating chambers to said inflator housing are independent of each other.

9. The multistage-inflating hybrid inflator as claimed in claim 8, wherein a gas generated in the first gas generating chamber flows independently in one direction within the inflator housing and a passage through which gas generated in the second gas generating chamber flows is located in an opposite direction with respect to a direction to which the gas generated in the first gas generating chamber flows.

10. A multistage-inflating hybrid inflator as claimed in any one of claims 1 and 2 to 4, wherein said ignition means chamber has a first ignition chamber and a second ignition chamber, each of the first ignition chamber and the second ignition chamber including ignition means, said first ignition chamber and said first gas generating chamber communicating with each other through a first communication hole which is closed with a first closing means before said first ignition means is activated, said second ignition chamber and said second gas generating chamber communicating with each other through a second communication hole which is closed with a second closing means before said second ignition means is activated.

11. The multistage-inflating hybrid inflator as claimed in claim 10, wherein the first ignition chamber and the second ignition chamber are aligned in parallel to each other in the lateral direction of the housing and adjacent to each other.

12. An air bag system provided with an activation signal-outputting means, comprising:
    an impact sensor;
    a control unit; and
    a module case in which the multistage-inflating hybrid inflator as claimed in any one of claims 1 and 2 to 4 and an air bag are accommodated, wherein an inflating speed of said air bag is adjustably set.

13. A multistage-inflating hybrid inflator for a safety system of a vehicle provided with an air bag, comprising:
    an inflator housing, an interior thereof being filled with a pressurized medium containing inert gas;
    a gas generator provided in said inflator housing and having at least one gas generating chamber for storing gas generating means; and
    a retainer disposed inside the gas generator, said retainer including a larger-diameter cylinder having one end closed and another end open, and a smaller-diameter cylinder having both ends open, the smaller-diameter cylinder being integrated with the larger-diameter cylinder to project toward the inside as well as the open end of the larger-diameter cylinder.

14. A multistage-inflating hybrid inflator as claimed in claim 13, wherein a side-wall length of the larger diameter cylinder and a side-wall length of the smaller-diameter cylinder are the same as or different from each other.

15. A multistage-inflating hybrid inflator as claimed in claim 13, wherein a side-wall length of the larger-diameter cylinder is longer or shorter than a side-wall length of the smaller-diameter cylinder.

16. A multistage-inflating hybrid inflator as claimed in claim 13, further comprising:
   a charge transferring chamber surrounded by said at least one gas generating chamber,
   wherein, the retainer is fitted into the charge-transferring chamber at the open end of the smaller-diameter cylinder, an outer side wall of the larger-diameter cylinder is in contact with an inner wall of the gas generating chamber, an inner wall of the smaller-diameter cylinder is in contact with an outer side wall of the charge-transferring chamber, and the at least one gas generating chamber is divided into at least two sections by the closed end in the longitudinal direction.

17. A gas generator having at least one gas generating chamber around a charge-transferring chamber, comprising:
   an inflator housing, an interior thereof being filled with a pressurized medium containing inert gas;
   a gas generator provided in said inflator housing and having at least one gas generating chamber for storing gas generating means; and
   a retainer disposed inside the gas generator, said retainer including a larger-diameter cylinder having one end closed and another end open, and a smaller-diameter cylinder having both ends open, the smaller-diameter cylinder being integrated with the larger-diameter cylinder to project toward the inside as well as the open end of the larger-diameter cylinder, the retainer being disposed in order to one of retain a gas generating agent and adjust an amount of the gas generating agents, the retainer being fitted into the charge-transferring chamber at an open end of the smaller-diameter cylinder, an outer side wall of the larger-diameter cylinder being in contact with an inner wall of the gas generating chamber, and the volume of the gas generating chamber being controlled by the closed end.

18. A multistage-inflating hybrid inflator as claimed in claim 16, wherein at least two retainers are disposed such that the open end of each of retainer may be arranged in the same direction.

19. A multistage-inflating hybrid inflator for a safety system of a vehicle provided with an air bag, comprising:
   an inflator housing having an interior thereof filled with a pressure medium containing an inert gas;
   a gas generator provided in said inflator housing and having a first gas generating chamber and a second gas generating chamber, each including gas generating means therein, and a single common charge transferring tube penetrating through the first gas generating chamber and the second gas generating chamber, the transferring tube providing heat to ignite the gas generating means provided inside the first gas generating chamber; and
   an ignition means chamber provided with ignition means connected to said gas generator, said ignition means including two initiators attached to one initiator collar and provided in said ignition means chamber such that at least one of two initiators is eccentrically placed with respect to at least one of the first gas generating chamber and the second combustion chamber.

20. A multistage-inflating hybrid inflator as claimed in claim 19, wherein the two initiators are attached to said one initiator collar by resin.

21. The multistage-inflating hybrid inflator as claimed in claim 19 or 20, wherein the first gas generating chamber and the second gas generating chamber are aligned in series in the longitudinal direction of the housing and adjacent to each other.

22. The multistage-inflating hybrid inflator as claimed in any of claims 19 to 20, wherein the ignition means chamber includes a first ignition chamber and a second ignition chamber, each of the first ignition chamber and the second ignition chamber including ignition means, the first ignition chamber communicating with the first gas generating chamber through a first communicating hole, the first communicating hole being closed by first closing means prior to activation of the first ignition means, the second igniting chamber communicating with the second gas generating chamber through a second communicating hole, the second communicating hole being closed by second closing means prior to activation of the ignition means.

23. An air bag system comprising:
   actuation signal-outputting means including an impact sensor and a control unit; and
   a module case containing therein the hybrid inflator as defined in any of claims 19 to 20.

24. A multistage-inflating hybrid inflator for a safety system of a vehicle provided with an air bag, comprising:
   an inflator housing, an interior thereof being filled with a pressurized medium containing inert gas, the inflator further having principal closing means to close, before actuation, transition of the pressurized medium outward to discharging ports and a projectile to rupture the principal closing means on actuation;
   a gas generator accommodated in the inflator housing and having at least one gas generating chamber, each containing gas generating means therein; and
   a retainer disposed inside the gas generator, said retainer including a larger-diameter cylinder having one end closed and another end open, and a smaller-diameter cylinder having both ends open, the smaller-diameter cylinder being integrated with the larger-diameter cylinder to project toward the inside as well as the open end of the larger-diameter cylinder.

25. A multistage-inflating hybrid inflator as claimed in claim 24, wherein a side-wall length of the larger diameter cylinder and a side-wall length of the smaller-diameter cylinder are the same as or different from each other.

26. A multistage-inflating hybrid inflator as claimed in claim 24, wherein a side-wall length of the larger-diameter cylinder is longer or shorter than a side-wall length of the smaller-diameter cylinder.

27. A multistage-inflating hybrid inflator as claimed in claim 24, wherein a tip of the projectile is disposed in a space defined by an element other than said inflator housing.

28. A multistage-inflating hybrid inflator as claimed in claim 24, further comprising:
   a charge transferring chamber surrounded by said at least one gas generating chamber,
   wherein, the retainer is fitted into the charge-transferring chamber at the open end of the smaller-diameter cylinder, an outer side wall of the larger-diameter cylinder is in contact with an inner wall of the gas generating chamber, an inner wall of the smaller-diameter cylinder is in contact with an outer side wall of the charge-transferring chamber, and the at least one gas generating chamber is divided into at least two sections by the closed end in the longitudinal direction.

29. A multistage-inflating hybrid inflator as claimed in claim 28, wherein at least two retainers are disposed such that the open end of each of retainer may be arranged in the same direction.

30. A multistage-inflating hybrid inflator as claimed in claim 1, wherein said transferring tube has a hole for communicating the first gas generating chamber and an interior of the transferring tube.

31. A multistage-inflating hybrid inflator as claimed in claim 19, wherein said transferring tube has a hole for communicating the first gas generating chamber and an interior of the transferring tube.

* * * * *